United States Patent
Koch et al.

(10) Patent No.: US 10,768,331 B2
(45) Date of Patent: Sep. 8, 2020

(54) WORK LAYER IMAGING AND ANALYSIS FOR IMPLEMENT MONITORING, CONTROL AND OPERATOR FEEDBACK

(71) Applicant: The Climate Corporation, San Francisco, CA (US)

(72) Inventors: Dale Koch, Tremont, IL (US); Dexter Travis, Hopedale, IL (US); Todd Swanson, Morton, IL (US); Dillon Sloneker, Danvers, IL (US)

(73) Assignee: The Climate Corporation, San Francisco, CA (US)

( * ) Notice: Subject to any disclaimer, the term of this patent is extended or adjusted under 35 U.S.C. 154(b) by 236 days.

(21) Appl. No.: 15/793,840

(22) Filed: Oct. 25, 2017

(65) Prior Publication Data
US 2018/0128933 A1 May 10, 2018

Related U.S. Application Data

(60) Provisional application No. 62/418,645, filed on Nov. 7, 2016.

(51) Int. Cl.
*A01B 79/00* (2006.01)
*A01B 47/00* (2006.01)
(Continued)

(52) U.S. Cl.
CPC .............. *G01V 3/12* (2013.01); *A01C 7/105* (2013.01); *A01C 7/203* (2013.01); *A01C 7/205* (2013.01);
(Continued)

(58) Field of Classification Search
CPC ......... A01C 7/085; A01C 7/102; A01C 7/105; A01B 69/00; A01B 79/005; A01B 47/00; G01V 11/00; G01V 8/20; G01V 3/12
See application file for complete search history.

(56) References Cited

U.S. PATENT DOCUMENTS 6,081,224 A     6/2000  Rosenbrock
8,869,629 B2 *  10/2014 Noble ................. A01C 7/105
                                                 73/861.73
(Continued)

FOREIGN PATENT DOCUMENTS

EP    1 914 352 A2    4/2008
RU    2 537 908 C2    1/2015
(Continued)

OTHER PUBLICATIONS

Flat Earth Inc., Flat Earth Impulse Radar Solutions, "Services", A Future Farm, http://future-farm.com, dated 2013, 3 pages.
(Continued)

*Primary Examiner* — Neel D Shah
(74) *Attorney, Agent, or Firm* — Hickman Palermo Becker Bingham LLP

(57) ABSTRACT

A soil imaging system having a work layer sensor disposed on an agricultural implement to generate an electromagnetic field through a soil area of interest as the agricultural implement traverses a field. A monitor in communication with the work layer sensor is adapted to generate a work layer image of the soil layer of interest based on the generated electromagnetic field. The work layer sensor may also generate a reference image by generating an electromagnetic field through undisturbed soil. The monitor may compare at least one characteristic of the reference image with at least one characteristic of the work layer image to generate a characterized image of the work layer of interest. The monitor may display operator feedback and may affect operational control of the agricultural implement based on the characterized image.

20 Claims, 14 Drawing Sheets

(51) Int. Cl.

| | | |
|---|---|---|
| *A01C 7/10* | (2006.01) | |
| *A01C 7/08* | (2006.01) | |
| *A01B 69/00* | (2006.01) | |
| *G01V 3/12* | (2006.01) | |
| *G01V 11/00* | (2006.01) | |
| *G01V 8/20* | (2006.01) | |
| *A01C 7/20* | (2006.01) | |
| *G01S 13/02* | (2006.01) | |
| *G01S 13/88* | (2006.01) | |
| *A01C 5/06* | (2006.01) | |
| *A01C 7/00* | (2006.01) | |

(52) U.S. Cl.
CPC ............. *G01S 13/02* (2013.01); *A01B 79/005* (2013.01); *A01C 5/066* (2013.01); *A01C 5/068* (2013.01); *A01C 7/006* (2013.01); *G01S 13/885* (2013.01)

(56) References Cited

U.S. PATENT DOCUMENTS

| 10,262,413 | B2 | 4/2019 | Strnad et al. | |
|---|---|---|---|---|
| 2003/0184747 | A1 | 10/2003 | Diekhans et al. | |
| 2005/0192752 | A1 | 9/2005 | Rooney et al. | |
| 2011/0303137 | A1* | 12/2011 | Tevs | G01V 8/20 111/170 |
| 2013/0057871 | A1* | 3/2013 | Kim | G01N 21/4795 356/479 |
| 2014/0352587 | A1 | 12/2014 | Wilhelmi et al. | |
| 2014/0365084 | A1 | 12/2014 | Chan et al. | |
| 2015/0094917 | A1 | 4/2015 | Blomme et al. | |
| 2015/0268218 | A1* | 9/2015 | Troxler | G01S 13/0209 342/21 |
| 2015/0310633 | A1 | 10/2015 | Nelan | |
| 2016/0109569 | A1* | 4/2016 | Chan | G01S 13/89 239/63 |
| 2018/0174291 | A1 | 6/2018 | Asada et al. | |
| 2019/0075714 | A1* | 3/2019 | Koch | G01B 7/26 |
| 2019/0244339 | A1 | 8/2019 | Strnad | |

FOREIGN PATENT DOCUMENTS

| WO | WO2014/066654 | 5/2014 |
|---|---|---|
| WO | WO 2016/182906 A1 | 11/2016 |

OTHER PUBLICATIONS

International Searching Authority, "Search Report", in application No. PCT/US16/31201, dated Aug. 19, 2016, 16 pages.
International Searching Authority, "Search Report" in application No. PCT/US17/58332, dated Jan. 4, 2018, 8 pages.
Current Claims in application No. PCT/US17/58332, dated Jan. 2018, 3 pages.
The International Bureau of WIPO, "International Preliminary Report on Patentabillity", in application No. PCT/US2017/058332, dated May 7, 2019, 7 pages.
Current Claims in application No. PCT/US2017/058332, dated May 2019, 3 pages.
Strnad, U.S. Appl. No. 15/572,289, filed Nov. 7, 2017, Notice of Allowance, dated Dec. 11, 2018.
Stand, U.S. Appl. No. 16/384,900, filed Apr. 15, 2019, Notice of Allowance, dated Mar. 23, 2020.
Current Claims in application No. AR20160101321, dated Feb. 2020, 5 pages.
Australian Patent Office, "Examination Report No. 1", dated Mar. 10, 2020, 3 pages.
Australian Claims in application No. 2016261331, dated Mar. 2020, 4 pages.
Argentina Patent Office, "Office Action" in AR20160101321, dated Feb. 11, 2020, 1 page.
Strnad, U.S. Appl. No. 16/384,900, filed Apr. 15, 2019, Notice of Allowability, dated Apr. 17, 2020.
Brazilian Patent Office, "Office Action" in Application No. 1120170240440, dated May 19, 2020, 2 pages.
Brazilian claims in Application No. 1120170240440, dated May 2020, 4 pages.
Brazil Patent Office, "Search Report" in application No. 1120170240440, dated May 19, 2020, 2 pages.
Brazil Claims in application No. 1120170240440, dated May 2020, 4 pages.
Adamchuk et al., "On-the-go Soil Sensors for Precision Agriculture", Computers and Electronics in Agriculture vol. 44, No. 1, dated Jan. 5, 2004, 21 pages.

* cited by examiner (a)

(b)

WORK LAYER IMAGING AND ANALYSIS FOR IMPLEMENT MONITORING, CONTROL AND OPERATOR FEEDBACK

BENEFIT CLAIM

This application claims the benefit under 35 U.S.C. 119(e) of provisional application 62/418,645, filed Nov. 7, 2016, the entire contents of which are hereby incorporated by reference as if fully set forth herein.

BACKGROUND

It is well known that proper and uniform seed trench depth, accurate placement of seed within the seed trench (at the proper depth and proper spacing), good seed-to-soil contact, and minimal crop residue within the seed trench are all critical factors in uniform seed emergence and high yields. Accordingly, various planter improvements have been proposed to achieve each of these factors. While conducting spot checks of the seed trench may help to provide some assurances that these critical factors are being achieved, such spot checks will only identify the conditions at the specific location being checked. Accordingly, there is a need for a system that will image the seed trench to verify and ensure these critical factors are being achieved during planting operations and to enable automatic or remote adjustment of the planter while on-the-go based on the images. There is a similar need for below-soil-surfacing-imaging and control for other types of agricultural implements, including tillage implements, sidedress or in-ground fertilizing implements and agricultural data gathering implements.

BRIEF DESCRIPTION OF THE DRAWINGS

The present disclosure is illustrated by way of example, and not by way of limitation, in the accompanying drawings and in which.

SUMMARY OF THE INVENTION

The appended claims may serve as a summary of the invention, a soil imaging system.

DETAILED DESCRIPTION

1. Disclosure Overview

Figure 1:
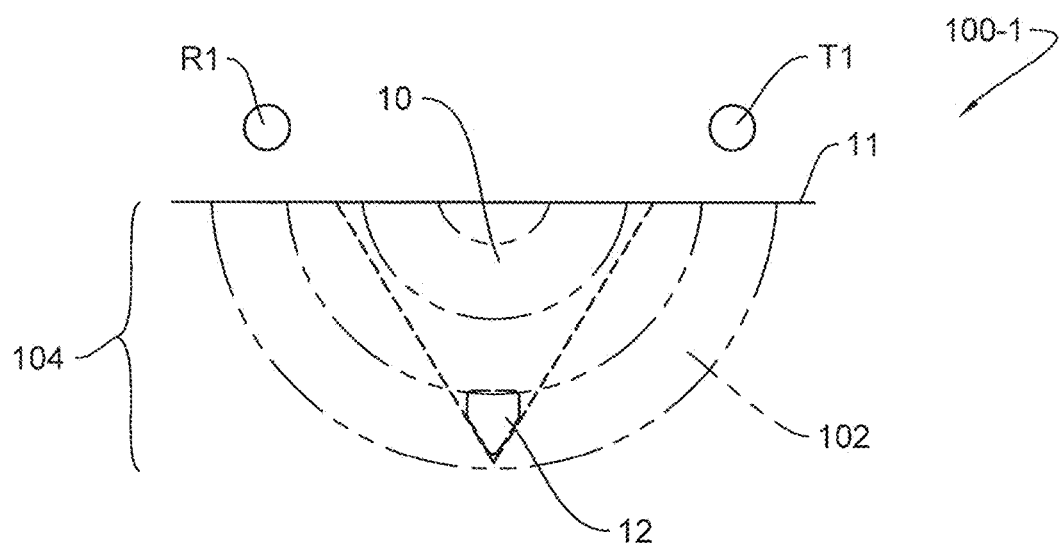
FIG. 1 schematically illustrates one embodiment of a work layer sensor, in elevation view, disposed in relation a seed trench.
Figure 3:
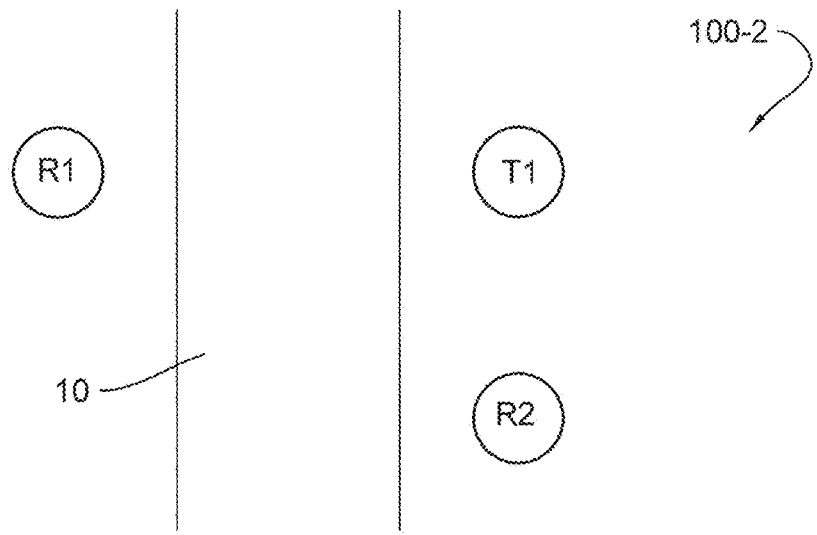
FIG. 3 schematically illustrates another embodiment of a work layer sensor, in plan view, disposed in relation to a seed trench.
Figure 5:
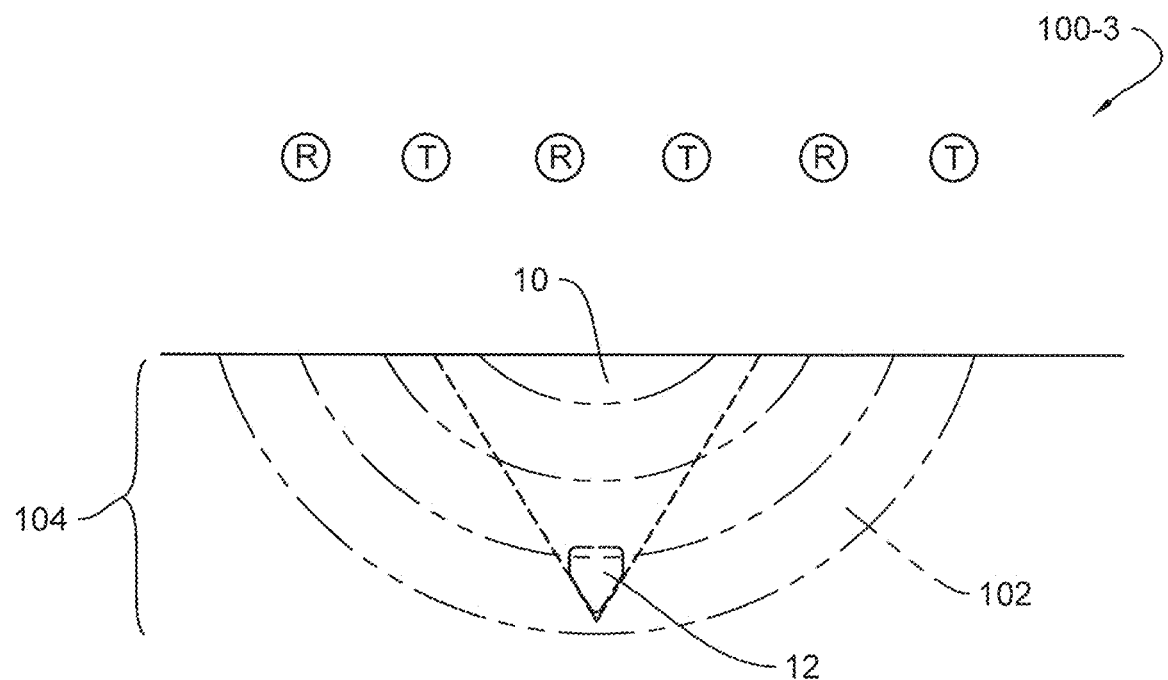
FIG. 5 schematically illustrates another embodiment of a work layer sensor, in elevation view, disposed in relation to a seed trench.

Referring now to the drawings, wherein like reference numerals designate identical or corresponding parts throughout the several views, FIG. 1, FIG. 3 and FIG. 5 schematically illustrate alternative embodiments of a work layer sensor 100 to generate a signal or image representative of the soil densities or other soil characteristics throughout a soil region of interest, hereinafter referred to as the "work layer" 104. The representative image or signal generated by the work layer sensor 100 is hereinafter referred to as the "work layer image" 110. In one particular application discussed later, the work layer sensors 100 may be mounted to a planter row unit 200 (FIG. 7) for generating a work layer image 110 of the seed trench as the planter traverses the field. The work layer image 110 may be displayed on a monitor 300 visible to an operator within the cab of a tractor and the planter may be equipped with various actuators for controlling the planter based on the characteristics of the work layer 104 as determined from the work layer image 110.

The work layer sensor 100 for generating the work layer image 110 may comprise a ground penetrating radar system, an ultrasound system, an audible range sound system, an electrical current system or any other suitable system for generating an electromagnetic field 102 through the work layer 104 to produce the work layer image 110. It should be understood that the depth and width of the work layer 104 may vary depending on the agricultural implement and operation being performed.

FIG. 1 is a schematic illustration of one embodiment of a work layer sensor 100-1 disposed in relation to a seed trench 10 formed in the soil 11 by a planter, wherein the seed trench 10 comprises the soil region of interest or work layer 104. In this embodiment, the work layer sensor 100-1 comprises a transmitter (T1) disposed on one side of the seed trench 10 and a receiver (R1) disposed on the other side of the seed trench 10 to produce the electromagnetic field 102 through the seed trench to generate the work layer image 110.

In some embodiments, the work layer sensor 100 may comprise a ground-penetration radar subsurface inspection system such as any of the following commercially available systems: (1) the StructureScan™ Mini HR available from GSSI in Nashua, N.H.; (2) the 3d-Radar GeoScope™ Mk IV coupled to a 3d-Radar VX-Series and/or DX-Series multi-channel antenna, all available from 3d-Radar AS in Trondheim, Norway; or (3) the MALA Imaging Radar Array System available from MALA Geoscience in Mala, Sweden. In such embodiments, the commercially available system may be mounted to the planter or other implement, or may be mounted to a cart which moves with the implement; in either case, the system is preferably disposed to capture an image of a work layer in the area of interest (e.g., the seed trench). In some embodiments, the work layer image 110 may be generated from the signal outputs of the work layer sensor 100 using commercially available software such as GPR-SLICE (e.g., version 7.0) available from GeoHiRes International Ltd. located in Borken, Germany.

Figure 2A:
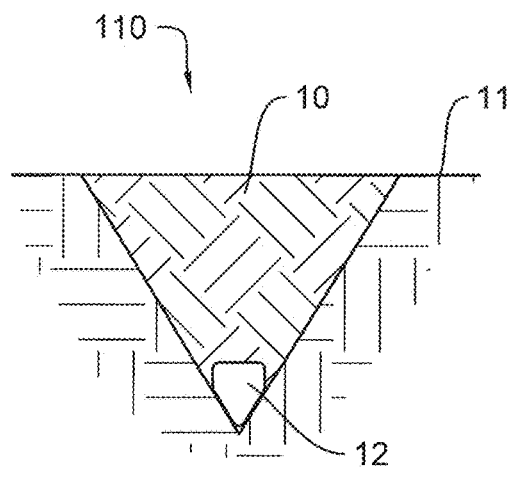
FIG. 2A, FIG. 2B, FIG. 2C are representative examples of work layer images generated by the work layer sensor of FIG. 1.
Figure 2B:
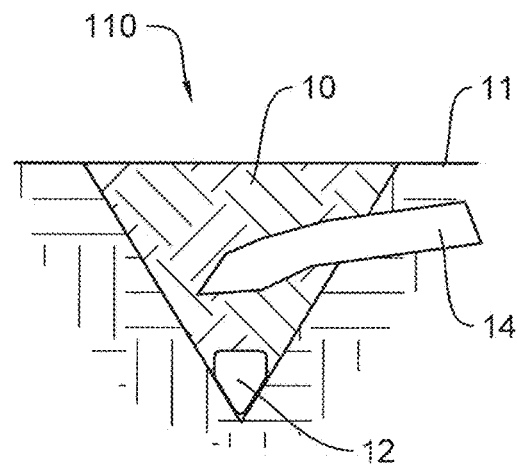
Figure 2C:
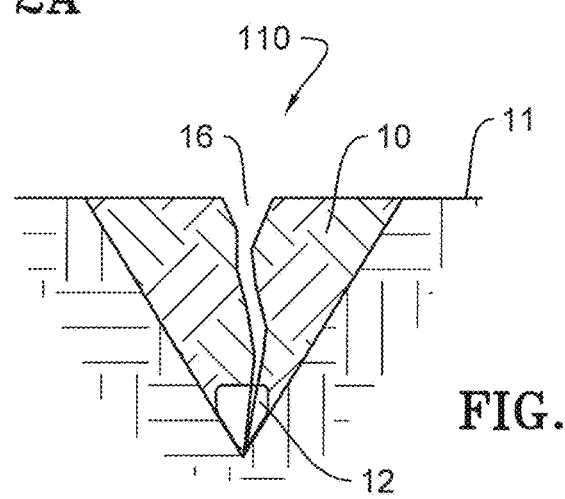

FIG. 2A, FIG. 2B, FIG. 2C are intended to be representative examples of work layer images 110 generated by the work layer sensor 100-1 of FIG. 1 showing various characteristics of the seed trench 10, including, for example, the trench depth, the trench shape, depth of seed 12, the seed depth relative to the trench depth, crop residue 14 in the trench, and the void spaces 16 within the trench. As described in more detail later, the work layer images 110 may be used to determine other characteristics of the work layer 104, including, for example, the seed-to-soil contact, percentage of trench closed, percentage of upper half of trench closed, percentage of lower half of trench closed, moisture of the soil, etc.

Figure 4A:
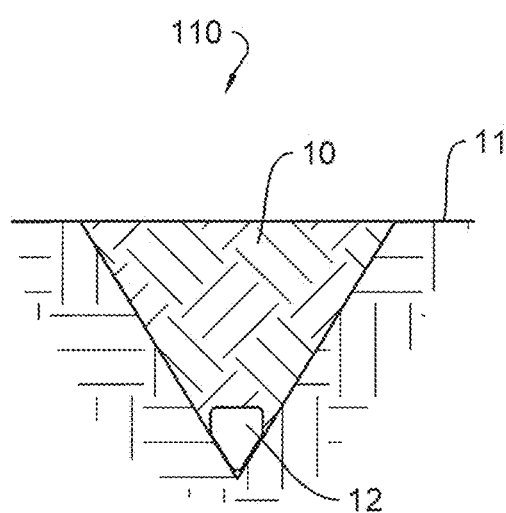
FIG. 4A, FIG. 4B are representative examples of work layer images generated by the work layer sensor of FIG. 3.
Figure 4B:
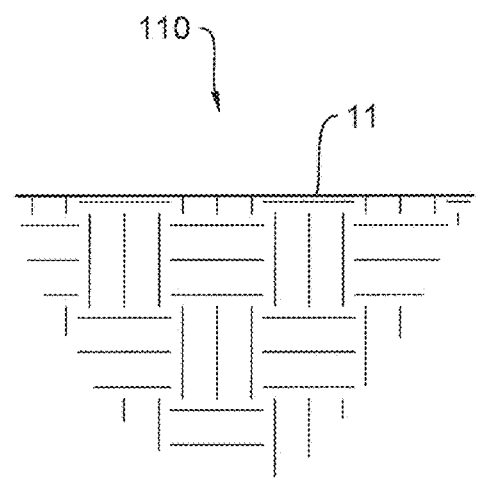

FIG. 3 schematically illustrates, in plan view, another embodiment of a work layer sensor 100-2 disposed with respect to a seed trench 10. In this embodiment, a transmitter (T1) is disposed on one side of the seed trench 10, a first receiver (R1) is disposed on the other side of the seed trench 10, and a second receiver (R2) is disposed adjacent and rearward of the transmitter (T1). FIG. 4A is a representative illustration of the work layer image 110 generated through the trench between the transmitter (T1) and the first receiver (R1)) and FIG. 4B is a representative illustration of the work layer image 110 generated between the transmitter (T1) and the second receiver (R2) providing an image of the undisturbed soil adjacent to the seed trench.

FIG. 5 is an elevation view schematically illustrating another work layer sensor embodiment 100-3 disposed with respect to a seed trench 10. In this embodiment, the work layer sensor 100-3 comprises a plurality of transmitter and receiver pairs disposed above and transverse to the seed trench 10.

Figure 6:
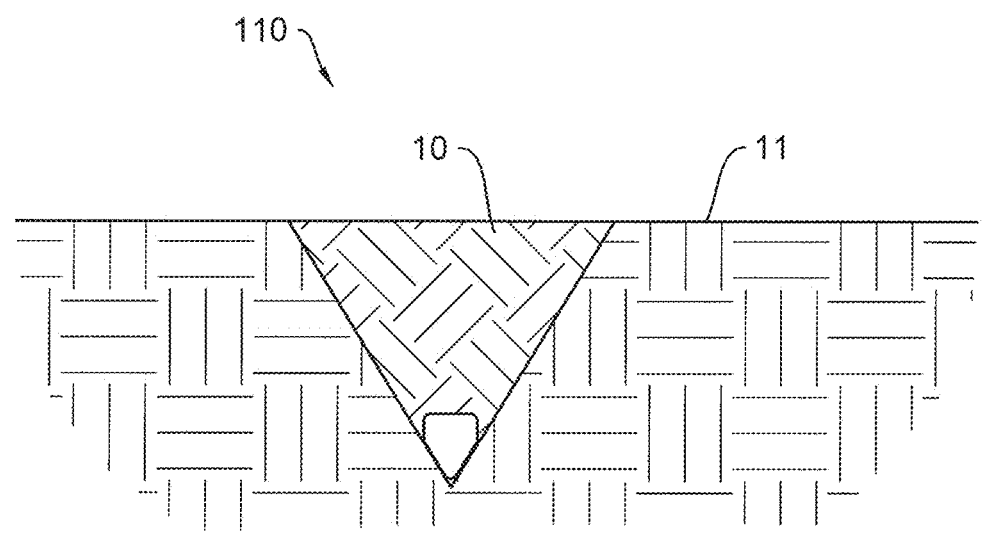
FIG. 6 is a representative example of a work layer image generated by the work sensor of FIG. 5.

FIG. 6 is a representative illustration of the work layer image 110 generated by the work layer sensor 100-3 of FIG. 5 which provides a view not only of the seed trench but also a portion of the soil adjacent to each side of the seed trench.

Figure 10:
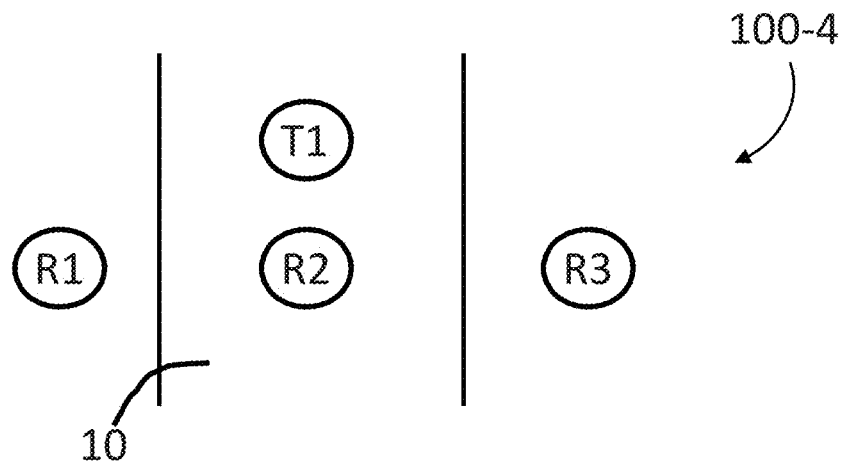
FIG. 10 schematically illustrates another embodiment of a work layer sensor, in plan view, disposed in relation to a seed trench.

FIG. 10 schematically illustrates, in plan view, another embodiment of a work layer sensor 100-4 disposed with respect to a seed trench 10. In this embodiment, a transmitter (T1) is disposed over the seed trench 10. Disposed rearward to transmitter (T1) in a direction of travel are three receivers (R1), (R2), and (R3). Receivers (R1) and (R3) are disposed over each side of seed trench 10, respectively. Receiver (R2) is disposed over seed trench 10. Work layer images similar to those shown in FIG. 2A, FIG. 2B, FIG. 2C can be generated by work layer sensor 100-4.

Figure 11:
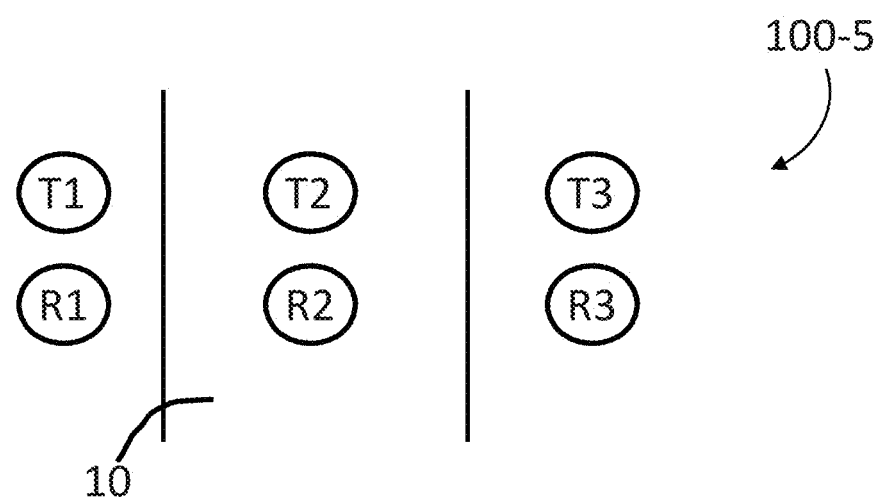
FIG. 11 schematically illustrates another embodiment of a work layer sensor, in plan view, disposed in relation to a seed trench.

FIG. 11 schematically illustrates, in plan view, another embodiment of a work layer sensor 100-5 disposed with respect to a seed trench 10. In this embodiment, transmitter (T2) is disposed over the seed trench 10, and transmitters (T1) and (T3) are disposed over each side of seed trench 10, respectively. Disposed rearward to transmitters (T1), (T2), and (T3) in a direction of travel are three receivers (R1), (R2), and (R3). Receivers (R1) and (R3) are disposed over each side of seed trench 10, respectively. Receiver (R2) is disposed over seed trench 10. Work layer images similar to those shown in FIG. 2A, FIG. 2B, FIG. 2C can be generated by work layer sensor 100-5.

Figure 12:
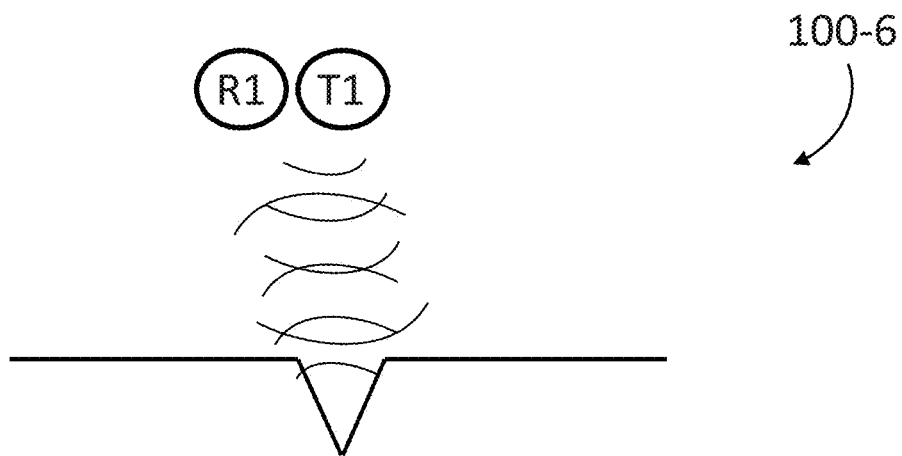
FIG. 12 schematically illustrates another embodiment of a work layer sensor, in side view, disposed in relation to a seed trench.

FIG. 12 schematically illustrates, in side view, another embodiment of a work layer sensor 100-6 disposed with respect to seed trench 10. In this embodiment, transmitter (T1) is disposed over the seed trench 10 and has a transmitting angle that encompasses both sides of seed trench 10. Receiver (R1) can be disposed adjacent to or rearward to transmitter (T1). By having a transmitting angle that reaches both sides of seed trench 10, the reflected signal received by receiver (R1) is then an average of both sides of seed trench 10. This provides a single measurement that is an average of the distance from the transmitter (T1) to the seed trench 10.

Figure 15:
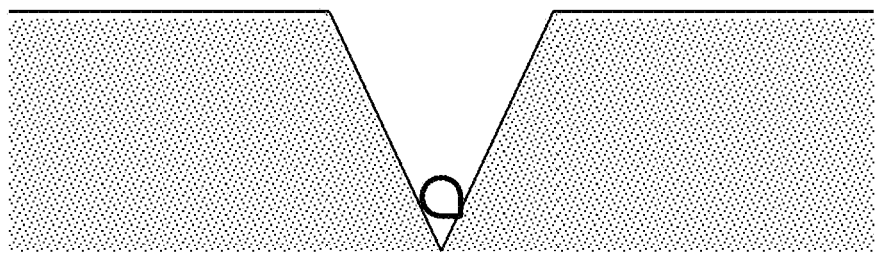
FIG. 15 is representative example of work layer image generated by any of the work layer sensors.

Any of the work layer sensor embodiments 100-1, 100-2, 100-3, 100-4, 100-5, 100-6 can also produce a work layer image as illustrated in FIG. 15. FIG. 15 is a profile of an open seed trench 10, shown with an optional seed.

Figure 13:
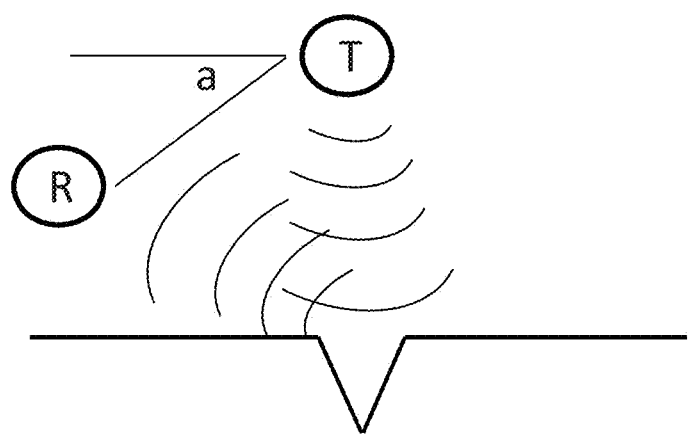
FIG. 13 schematically illustrates, in side view, a spatial relationship between a transmitter and a receiver.

For each of the work layer sensor embodiments 100-1, 100-2, 100-3, 100-4, 100-5, 100-6 the frequency of operation of the work layer sensors 100 and the vertical position of the transmitters (T) and receivers (R) above the soil and the spacing between the transmitters (T) and receivers (R) are selected to minimize signal to noise ratio while also capturing the desired depth and width of the soil region of interest (the work layer 104) for which the work layer image 110 is generated. In an embodiment illustrated in FIG. 13, the height of the receiver (R) above the ground can be less than the height of the transmitter (T) above the ground. An angle a formed between the transmitter (T) and the receiver (R) can be 0 up to 80°.

Figure 14:
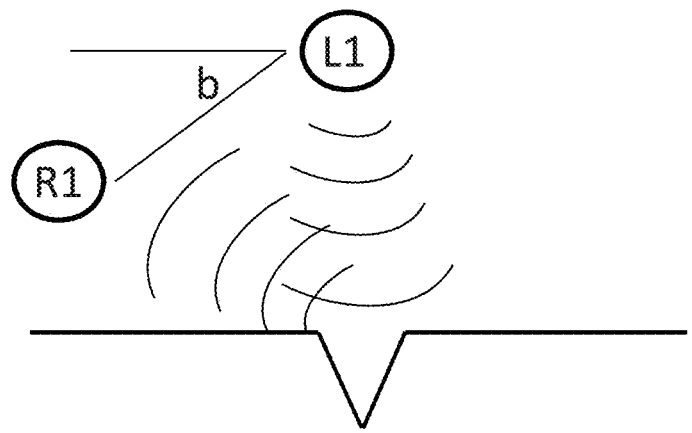
FIG. 14 schematically illustrates another embodiment, in side view, of a laser system.

In an embodiment illustrated in FIG. 14, a laser (L1) is positioned above a seed trench 10 and projects a laser into seed trench 10. A receiver (R1), such as a camera, is positioned to receive the reflected laser signal. Receiver (R1) is at a height above ground that is less than the height of laser (L1) above the ground. An angle b formed between the laser (L1) and the receiver (R) can be greater than 0 up to 80°. The same control system can be used, with laser (L1) replacing a transmitter (T).

In one embodiment, the transmitter frequency selected can be one that can penetrate vegetation and see the soil below. By not seeing the vegetation, a more accurate measurement is obtained for the depth of seed trench 10. It has been determined that the higher the frequency, the more the radar signal is reflected by vegetation. In one embodiment, the frequency is 24 GHz. In another embodiment, the frequency selected can be one that can penetrate dust. Dust can be generated as an agricultural vehicle traverses a field. Frequencies in a range of 1 to 100 GHz can penetrate dust. In any of the work layer sensor embodiments 100-1, 100-2, 100-3, 100-4, 100-5, 100-6, any of the transmitters (T) or receivers (R) can have a frequency that penetrates vegetation and dust. In another embodiment, any of the work layer sensor embodiments 100-1, 100-2, 100-3, 100-4, 100-5 any of the transmitters (T) or receivers (R) can be replaced by multiple transmitters (T) or receivers (R) at the locations illustrated with each transmitter (T) or receiver (R) having a different frequency, such as one that will penetrate through vegetation and one that will penetrate through dust. A composite of the two work layers can be used to generate the profile of seed trench 10.

In one embodiment, the radar is Doppler radar. Doppler radar can provide the speed of a row unit 200, which can then be used in a control system to change the rate of application of an agricultural input to obtain a selected application per linear distance or area. Agricultural inputs include, but are not limited to, seed, fertilizer, insecticide, herbicide, and fungicide. The Doppler radar can be coherent pulsed, pulse-Doppler, continuous wave, or frequency modulation. The Doppler radar can be used with any of work layer sensor embodiments 100-1, 100-2, 100-3, 100-4, 100-5, 100-6.

In one embodiment, the radar is a phased array radar. With a phased array radar, the signals generated by the phased array can be moved from side to side in seed trench 10 to provide a more detailed profile of seed trench 10. The phased array radar can be used with any of work layer sensor embodiments 100-1, 100-2, 100-3, 100-4, 100-5, 100-6.

Figure 7:
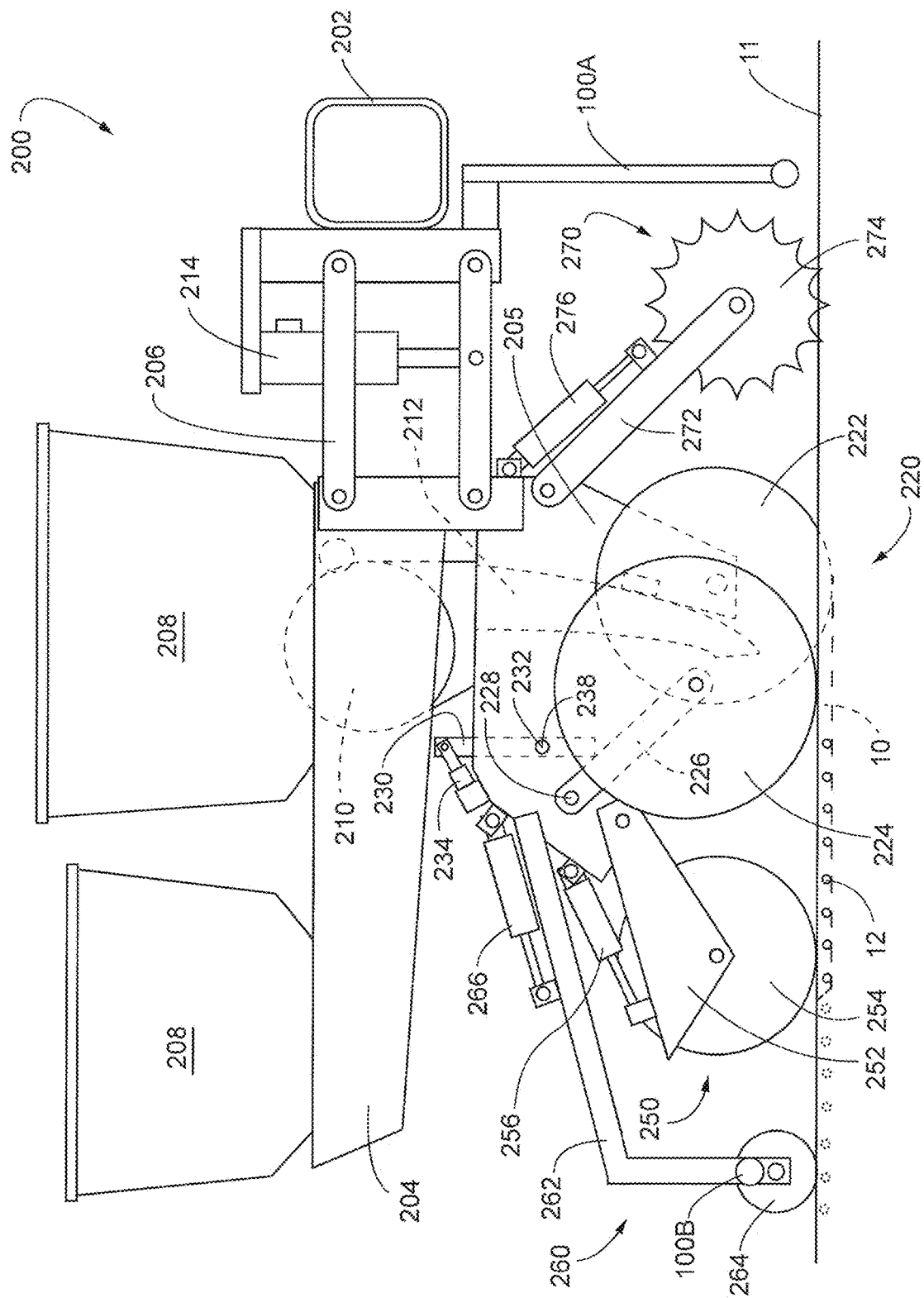
FIG. 7 is a side elevation view of an embodiment of a row unit of an agricultural planter incorporating a work layer sensor of FIG. 1, FIG. 3 or FIG. 5.

Planter Applications FIG. 7 illustrates one example of a particular application of the work layer sensors 100 disposed on a row unit 200 of an agricultural planter. The row unit 200 includes a work layer sensor 100A disposed on a forward end of the row unit 200 and a work layer sensor 100B disposed rearward end of the row unit 200. The forward and rearward work layer sensors 100A, 100B may comprise any of the embodiments of the work layer sensors 100-1, 100-2, 100-3, 100-4, 100-5, 100-6 previously described.

The forward work layer sensor 100A is disposed to generate a reference work layer image (hereinafter a "reference layer image") 110A of the soil prior to the soil being disturbed by the planter, whereas the rearward work layer sensor 100B generates the work layer image 110B, which in this example, is the image of the closed seed trench 10 in which the seed has been deposited and covered with soil. For the reasons explained later, it is desirable to obtain both a reference image 110A and the work layer image 110B for analysis of the soil characteristics through the work layer 104.

It should be appreciated that the forward and rearward work layer sensors 100A, 100B referenced in FIG. 7 may employ any of the embodiments 100-1, 100-2 or 100-3. 100-4, 100-5, 100-6 previously described. However, it should be appreciated that if the embodiments 100-2, 100-3, 100-4, or 100-5 are employed, the forward work layer sensor 100A may be eliminated because the embodiments 100-2, 100-3, 100-4, and 100-5 are configured to generate the work layer images 110 of undisturbed soil adjacent to the seed trench 10 which could serve as the reference layer image 110A.

With respect to FIG. 7, the row unit 200 is comprised of a frame 204 pivotally connected to the toolbar 202 by a parallel linkage 206 enabling each row unit 200 to move vertically independently of the toolbar 202. The frame 204 operably supports one or more hoppers 208, a seed meter 210, a seed delivery mechanism 212, a downforce control system 214, a seed trench opening assembly 220, a trench closing assembly 250, a packer wheel assembly 260, and a row cleaner assembly 270. It should be understood that the row unit 200 shown in FIG. 7 may be for a conventional planter or the row unit 200 may be a central fill planter, in which case the hoppers 208 may be replaced with one or more mini-hoppers and the frame 204 modified accordingly as would be recognized by those of skill in the art.

The downforce control system 214 is disposed to apply lift and/or downforce on the row unit 200 such as disclosed in U.S. Publication No. US2014/0090585, which is incorporated herein in its entirety by reference.

The seed trench opening assembly 220 includes a pair of opening discs 222 rotatably supported by a downwardly extending shank member 205 of the frame 204. The opening discs 222 are arranged to diverge outwardly and rearwardly so as to open a v-shaped trench 10 in the soil 11 as the planter traverses the field. The seed delivery mechanism 212, such as a seed tube or seed conveyor, is positioned between the opening discs 222 to deliver seed from the seed meter 210 and deposit it into the opened seed trench 10. The depth of the seed trench 10 is controlled by a pair of gauge wheels 224 positioned adjacent to the opening discs 222. The gauge wheels 224 are rotatably supported by gauge wheel arms 226 which are pivotally secured at one end to the frame 204 about pivot pin 228. A rocker arm 230 is pivotally supported on the frame 204 by a pivot pin 232. It should be appreciated that rotation of the rocker arm 230 about the pivot pin 232 sets the depth of the trench 10 by limiting the upward travel of the gauge wheel arms 226 (and thus the gauge wheels) relative to the opening discs 222. The rocker arm 230 may be adjustably positioned via a linear actuator 234 mounted to the row unit frame 204 and pivotally coupled to an upper end of the rocker arm 230. The linear actuator 234 may be controlled remotely or automatically actuated as disclosed, for example, in International Publication No. WO2014/186810, which is incorporated herein in its entirety by reference.

A downforce sensor 238 is configured to generate a signal related to the amount of force imposed by the gauge wheels 224 on the soil. In some embodiments the pivot pin 232 for the rocker arm 230 may comprise the downforce sensor 238, such as the instrumented pins disclosed in U.S. Pat. No. 8,561,472, which is incorporated herein in its entirety by reference.

The seed meter 210 may be any commercially available seed meter, such as the fingertype meter or vacuum seed meter, such as the VSet® meter, available from Precision Planting LLC, 23207 Townline Rd, Tremont, Ill. 61568.

The trench closing assembly 250 includes a closing wheel arm 252 which pivotally attaches to the row unit frame 204. A pair of offset closing wheels 254 are rotatably attached to the closing wheel arm 252 and angularly disposed to direct soil back into the open seed trench so as to "close" the soil trench. An actuator 256 may be pivotally attached at one end to the closing wheel arm 252 and at its other end to the row unit frame 204 to vary the down pressure exerted by the closing wheels 254 depending on soil conditions. The closing wheel assembly 250 may be of the type disclosed in International Publication No. WO2014/066650, which is incorporated herein in its entirety by reference.

The packer wheel assembly 260 comprises an arm 262 pivotally attached to the row unit fame 204 and extends rearward of the closing wheel assembly 250 and in alignment therewith.

The arm 262 rotatably supports a packer wheel 264. An actuator 266 is pivotally attached at one end to the arm and at its other end to the row unit frame 204 to vary the amount of downforce exerted by the packer wheel 264 to pack the soil over the seed trench 10.

The row cleaner assembly 270 may be the CleanSweep® system available from Precision Planting LLC, 23207 Townline Rd, Tremont, Ill. 61568. The row cleaner assembly 270 includes an arm 272 pivotally attached to the forward end of the row unit frame 204 and aligned with the trench opening assembly 220. A pair of row cleaner wheels 274 are rotatably attached to the forward end of the arm 272. An actuator 276 is pivotally attached at one end to the arm 272 and at its other end to the row unit frame 204 to adjust the downforce on the arm to vary the aggressiveness of the action of the row cleaning wheels 274 depending on the amount of crop residue and soil conditions.

It should be appreciated that rather than positioning the work layer sensors 100 as shown in FIG. 7, the work layer sensors may be positioned after the row cleaner assembly 270 and before the trench opening assembly 220 or in one or more other locations between the trench opening discs 222 and the closing wheels 254 or the packing wheel 264 depending on the soil region or characteristics of interest.

Figure 8:
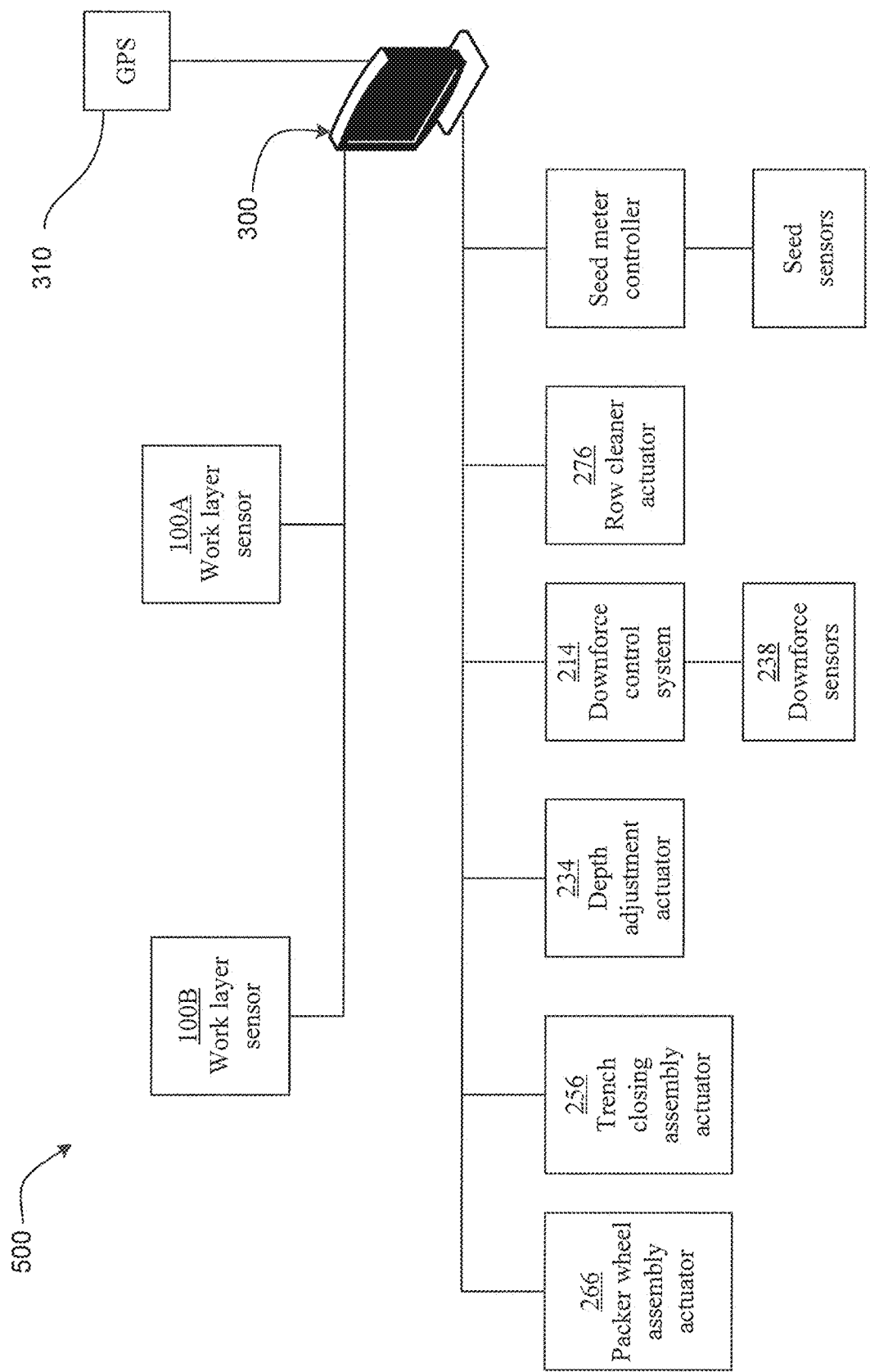
FIG. 8 illustrates an embodiment of a work layer implement monitoring, control and operator feedback system.

Planter Control and Operator Feedback FIG. 8 is a schematic illustration of a system 500 which employs work layer sensors 100 to provide operator feedback and to control the planter row unit 200. Work layer sensors 100A, 100B are disposed to generate a reference layer image 110A of undisturbed soil and a work layer image 110B of the closed seed trench (i.e., after seed is deposited, covered with soil by the closing wheel assembly 250 and the soil packed with the packing wheel assembly 260). As previously described, the work layer sensors 100A, 100B may be separate work layer sensors disposed forward and rearward of the row unit 200 as illustrated in FIG. 7, or the work layer sensors 100A, 100B may comprise a single work layer sensor with transmitters (T) and receivers (R) disposed to generate both a reference layer image 110A and a work layer image 110B.

The work layer image 110B may be communicated and displayed to the operator on a monitor 300 comprising a display, a controller and user interface such as a graphical user interface (GUI), within the cab of the tractor.

The monitor 300 may be in signal communication with a GPS unit 310, the row cleaner actuator 276, the downforce control system 214, the depth adjustment actuator 234, the trench closing assembly actuator 256 and the packer wheel assembly actuator 266 to enable operational control of the planter based on the characteristics of the work layer image 110B.

For example, if the work layer image 110B indicates that residue in the seed trench 10 is above a predetermined threshold (as explained below), a signal is generated by the monitor 300 to actuate the row cleaner actuator 276 to increase row cleaner downforce. As another example, if the seed depth is less than a predetermined threshold (as explained below), a signal is generated by the monitor 300 to actuate the downforce control system 214 to increase the downforce and/or to actuate the depth adjustment actuator 234 to adjust the gauge wheels 234 relative to the opening discs 232 to increase the trench depth. Likewise, if the seed depth is greater than a predetermined threshold, a signal is generated by the monitor 300 to actuate the downforce control system 214 to decrease the downforce and/or to actuate the depth adjustment actuator 234 to decrease the trench depth. As another example, if the upper portion of the trench has more than a threshold level of void space (as explained below), a signal is generated by the monitor 300 to actuate the trench closing wheel assembly actuator 256 to increase the downforce on the closing wheels 254. As another example, if the lower portion of the trench has more than a threshold level of void space (as explained below), a signal is generated by the monitor 300 to actuate the packer wheel assembly actuator 266 to increase the downforce on the packer wheel 264.

In still other examples, the work layer image 110B may identify and/or analyze (e.g., determine depth, area, volume, density or other qualities or quantities of) subterranean features of interest such as tile lines, large rocks, or compaction layers resulting from tillage and other field traffic. Such subterranean features may be displayed to the user on the monitor 300 and/or identified by the monitor 300 using an empirical correlation between image properties and a set of subterranean features expected to be encountered in the field. In one such example, the area traversed by the gauge wheels (or other wheels) of the planter (or tractor or other implement or vehicle) may be analyzed to determine a depth and/or soil density of a compaction layer beneath the wheels. In some such examples, the area of the work layer image may be divided into sub-regions for analysis based on anticipated subterranean features in such sub-regions (e.g., the area traversed by the gauge wheels may be analyzed for compaction).

In other examples, the monitor 300 may estimate a soil property (e.g., soil moisture, organic matter, or electrical conductivity, water table level) based on image properties of the work layer image 110B and display the soil property to the user as a numerical (e.g., average or current) value or a spatial map of the soil property at geo-referenced locations in the field associated with each soil property measurement (e.g., by correlating measurements with concurrent geo-referenced locations reported the GPS unit 310).

Alternatively or additionally, the monitor 300 could be programmed to display operational recommendations based on the characteristics of the work layer image 110B. For example, if the work layer image 110B identifies that the seed 12 is irregularly spaced in the trench 10 or if the seed 12 is not being uniformly deposited in the base of the trench, or if the spacing of the seed 12 in the trench does not match the anticipated spacing of the seed based on the signals generated by the seed sensor or speed of the seed meter, such irregular spacing, nonuniform positioning or other inconsistencies with anticipated spacing may be due to excess speed causing seed bounce within the trench or excess vertical acceleration of the row unit. As such, the monitor 300 may be programmed to recommend decreasing the planting speed or to suggest increasing downforce (if not automatically controlled as previously described) to reduce vertical acceleration of the planter row units. Likewise, to the extent the other actuators 276, 214, 234, 256, 266 are not integrated with the monitor controller, the monitor may be programmed to display recommendations to the operator to make manual or remote adjustments as previously described based on the characteristics of the work layer image 110B.

Figure 9:
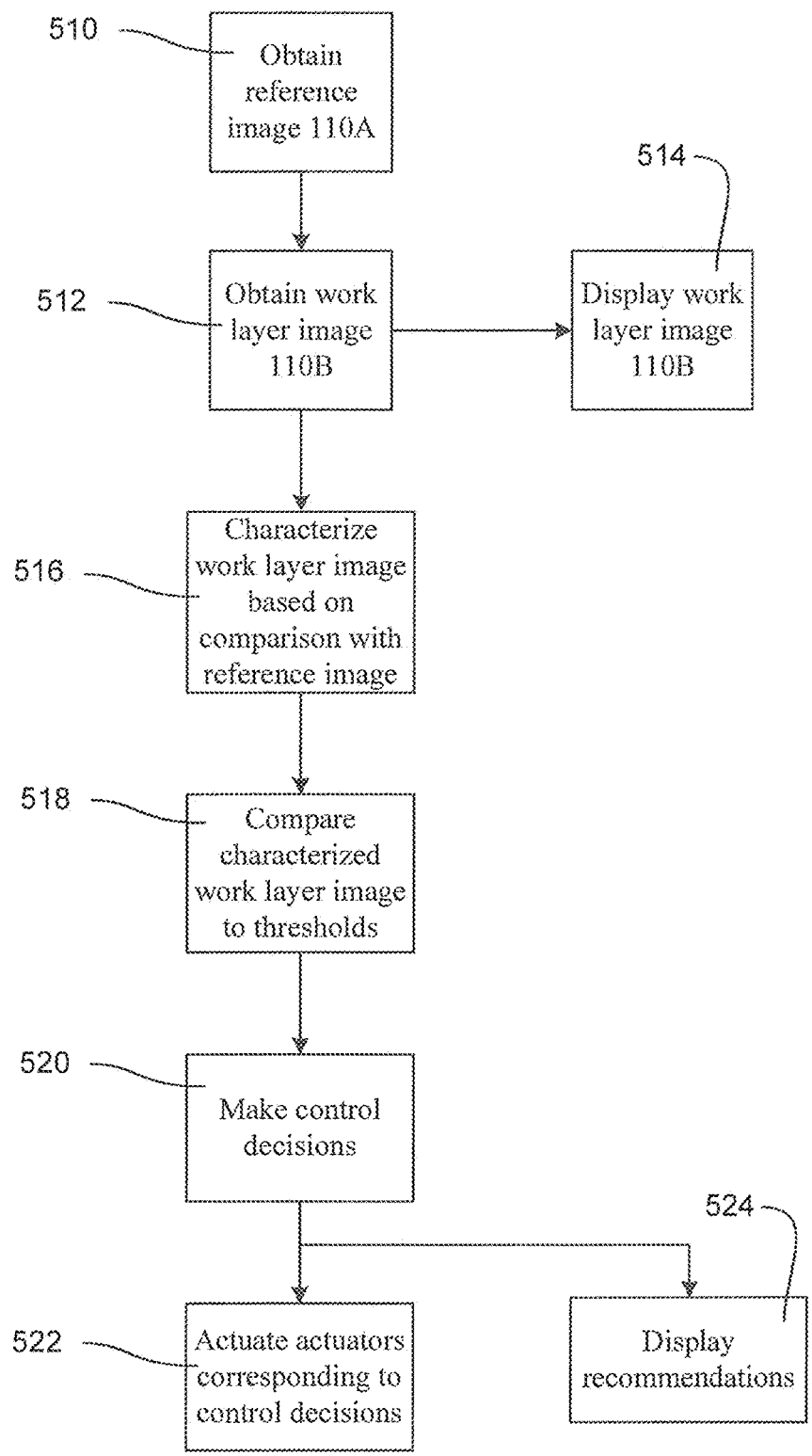
FIG. 9 is a chart showing a process for work layer implement monitoring, control and operator feedback.

FIG. 9 illustrates the process steps for controlling the planter and providing operator feedback. At steps 510 and 512, the reference image 110A and work layer image 110B is generated by the work image sensor(s) 100. At step 514, the work layer image 110B may be displayed to the operator on the monitor 300 in the cab of the tractor. At step 516, the reference layer image 110A is compared with the work layer image 110B to characterize the work layer image. At step 518, the characterized work layer image 110B is compared to predetermined thresholds. At step 520, control decisions are made based on the comparison of the characterized work layer image 110B with the predetermined thresholds. At step 522, the planter components may be controlled by the monitor 300 generating signals to actuate one or more of the corresponding actuators 276, 214, 234, 256, 266 and/or at step 524, corresponding 0 recommendations may be displayed to the operator on the monitor display.

To characterize the work layer image 110B at step 516, the monitor 300 compares one or more characteristics (e.g., density) of the reference image 110A with the same characteristics of the work layer image 110B. In some embodiments, a characterized image may be generated comprising only portions of the work layer image differing from the reference image by at least a threshold value. The characterized image may then be used to identify and define features of the work layer image 110B, such as the trench shape, the trench depth, residue in the trench, seeds and seed placement within the trench, void spaces within the trench, and density differences of the soil within the trench.

For example, to determine the seed depth, the seed is identified or identifiable from the work layer image 110B by determining regions within the work layer image having a size or shape corresponding to a seed and having a density range empirically corresponding to seed.

Once a region is identified as a seed, the vertical position of the seed with respect to the soil surface is readily measurable or determined.

As another example, the amount of residue in the trench can be determined by (a) defining the area of the trench cross-section (based on soil density differences between the reference image 110A and the work layer image 110B); (b) by identifying the regions within the trench having a density range empirically corresponding to residue; (c) totaling the area of the regions corresponding to residue; and (d) dividing the residue area by the trench cross-sectional area.

Other Applications—It should be appreciated that work layer sensors 100 may be employed with other agricultural implements and operations, such as, for example, tillage operations and/or side-dress fertilization operations, or in connection with agricultural data gathering operations to view or analyze below-surface soil characteristics, seed placement, root structure, location of underground water-management features such as tiling, etc.

When employed with tillage implements, the work layer sensors 100 may be disposed forward of any tillage tools (i.e., shank, disk, blade, knife, spoon, coulter, etc.) or between 1 forward and rearward spaced tillage tools and/or rearward of any tillage tools.

When employed with sidedress or other in-ground fertilization tools, the work layer sensors 100 may be disposed forward or rearward of any sidedress or in-ground tools (i.e., shank, disk, blade, knife, spoon, coulter, leveling basket harrows, etc.).

When employed with a dedicated measurement implement, the work layer sensors 100 may be disposed above undisturbed soil which may or may not have residue cleared by a row cleaner.

For the tillage implements and sidedress or in-ground fertilization tools, actuators on these implements can be automatically controlled to adjust depth of the tillage tools or the monitor 300 can be programmed to provide feedback or recommendations to the operator to manually adjust or remotely adjust the actuators as described above with respect to the planter application. For example, if the feedback or recommendations to the operator indicate that the depth of the tillage tools should be adjusted, an actuator associated with ground engaging wheels supporting the toolbar or a section of the toolbar may be actuated to raise or lower the toolbar to decrease or increase the depth of penetration of the toolbars. Alternatively, separate actuators may be associated with individual tillage tools to adjust the depth of the individual tillage tools.

As another example, if the work layer images indicate that the implement is approaching more dense or compact soil, actuators associated to adjust downforce or pressure may be actuated to increase the downforce as the implement passes through the more dense or compact soil. In other embodiments if the work layer images across the width of the implement indicate that one side or the other is tilling the soil more aggressively, an actuator associated with a wing of the implement may be actuated to ensure balancing of the aggressiveness of tillage tools across the side-to-side width of the implement. Likewise, an actuator associated with fore and aft leveling of the implement may be actuated to ensure aggressiveness of tools on the front of the implement are balanced with those on the back. In still other embodiments, actuators may be provided to adjust the angle of attack of a disc gang or wing of a tillage implement, or individual tillage tools depending on the work layer images and operator feedback as the implement traverses the field encountering different soil conditions.

2. Example Agricultural Intelligence Computer System 2.1 Structural Overview

Figure 16:
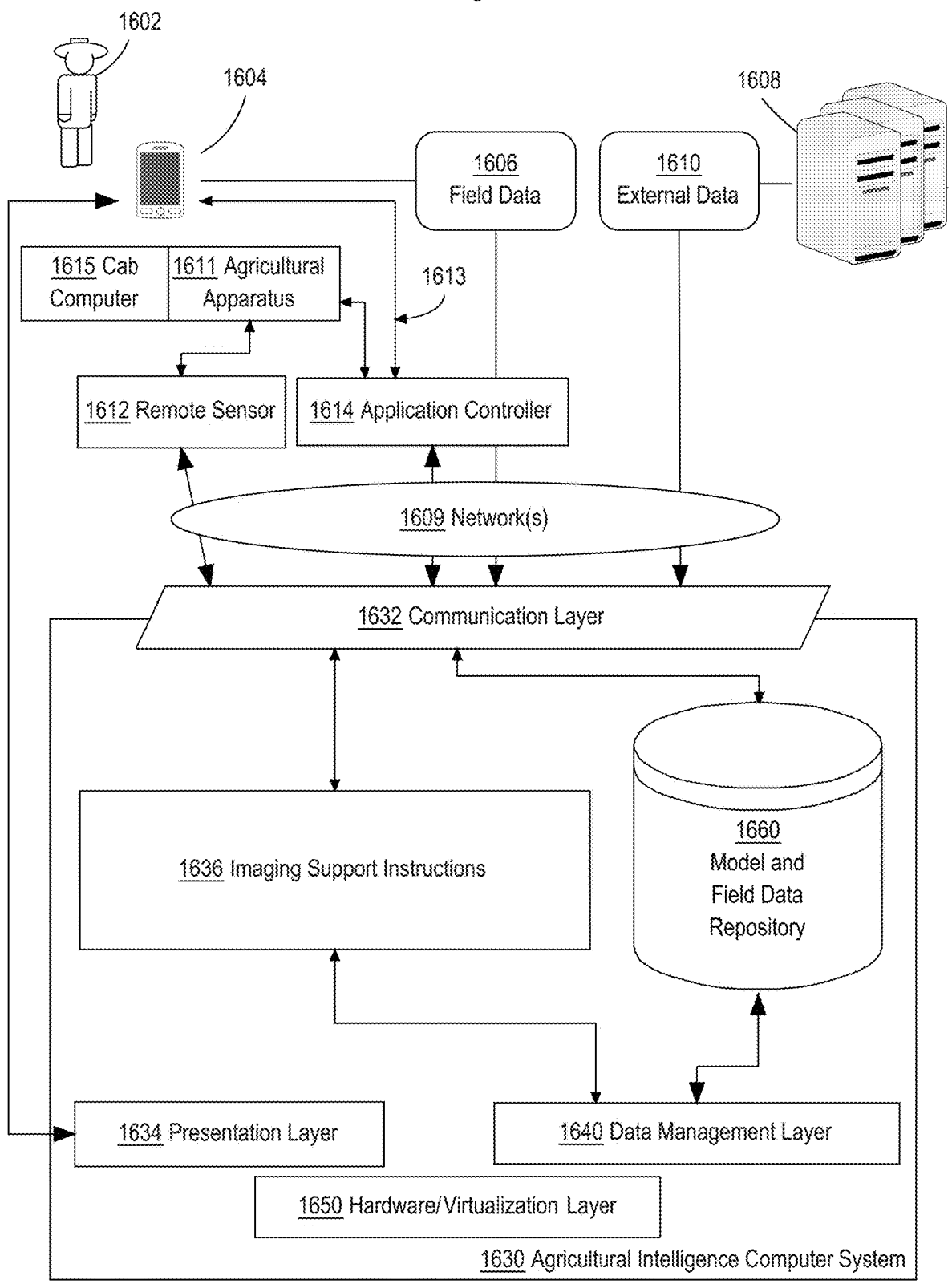
FIG. 16 illustrates an example computer system that is configured to perform the functions described herein, shown in a field environment with other apparatus with which the system may interoperate.

FIG. 16 illustrates an example computer system that is configured to perform the functions described herein, shown in a field environment with other apparatus with which the system may interoperate. In one embodiment, a user 1602 owns, operates or possesses a field manager computing device 1604 in a field location or associated with a field location such as a field intended for agricultural activities or a management location for one or more agricultural fields. The field manager computer device 1604 is programmed or configured to provide field data 1606 to an agricultural intelligence computer system 1630 via one or more networks 1609.

Examples of field data 1606 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 1608 is communicatively coupled to agricultural intelligence computer system 1630 and is programmed or configured to send external data 1610 to agricultural intelligence computer system 1630 via the network(s) 1609. The external data server computer 1608 may be owned or operated by the same legal person or entity as the agricultural intelligence computer system 1630, or by a different person or entity such as a government agency, non-governmental organization (NGO), and/or a private data service provider. Examples of external data include weather data, imagery data, soil data, or statistical data relating to crop yields, among others. External data 1610 may consist of the same type of information as field data 1606. In some embodiments, the external data 1610 is provided by an external data server 1608 owned by the same entity that owns and/or operates the agricultural intelligence computer system 1630. For example, the agricultural intelligence computer system 1630 may include a data server focused exclusively on a type of data that might otherwise be obtained from third party sources, such as weather data. In some embodiments, an external data server 1608 may actually be incorporated within the system 1630.

An agricultural apparatus 1611 may have one or more remote sensors 1612 fixed thereon, which sensors are communicatively coupled either directly or indirectly via agricultural apparatus 1611 to the agricultural intelligence computer system 1630 and are programmed or configured to send sensor data to agricultural intelligence computer system 1630. Examples of agricultural apparatus 1611 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 1611 may comprise a plurality of sensors 1612 that are coupled locally in a network on the apparatus; controller area network (CAN) is example of such a network that can be installed in combines, harvesters, sprayers, and cultivators. Application controller 1614 is communicatively coupled to agricultural intelligence computer system 1630 via the network(s) 1609 and is programmed or configured to receive one or more scripts that are used to control an operating parameter of an agricultural vehicle or implement from the agricultural intelligence computer system 1630. For instance, a controller area network (CAN) bus interface may be used to enable communications from the agricultural intelligence computer system 1630 to the agricultural apparatus 1611, such as how the CLIMATE FIELDVIEW DRIVE, available from The Climate Corporation, San Francisco, Calif., is used. Sensor data may consist of the same type of information as field data 1606. In some embodiments, remote sensors 1612 may not be fixed to an agricultural apparatus 1611 but may be remotely located in the field and may communicate with network 1609.

The apparatus 1611 may comprise a cab computer 1615 that is programmed with a cab application, which may comprise a version or variant of the mobile application for device 1604 that is further described in other sections herein. In an embodiment, cab computer 1615 comprises a compact computer, often a tablet-sized computer or smartphone, with a graphical screen display, such as a color display, that is mounted within an operator's cab of the apparatus 1611. Cab computer 1615 may implement some or all of the operations and functions that are described further herein for the mobile computer device 1604.

The network(s) 1609 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 16. The various elements of FIG. 16 may also have direct (wired or wireless) communications links. The sensors 1612, controller 1614, external data server computer 1608, and other elements of the system each comprise an interface compatible with the network(s) 1609 and are programmed or configured to use standardized protocols for communication across the networks such as TCP/IP, Bluetooth, CAN protocol and higher-layer protocols such as HTTP, TLS, and the like.

Agricultural intelligence computer system 1630 is programmed or configured to receive field data 1606 from field manager computing device 1604, external data 1610 from external data server computer 1608, and sensor data from remote sensor 1612. Agricultural intelligence computer system 1630 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 1614, in the manner described further in other sections of this disclosure.

In an embodiment, agricultural intelligence computer system 1630 is programmed with or comprises a communication layer 1632, presentation layer 1634, data management layer 1640, hardware/virtualization layer 1650, and model and field data repository 1660. "Layer," in this context, refers to any combination of electronic digital interface circuits, microcontrollers, firmware such as drivers, and/or computer programs or other software elements.

Communication layer 1632 may be programmed or configured to perform input/output interfacing functions including sending requests to field manager computing device 1604, external data server computer 1608, and remote sensor 1612 for field data, external data, and sensor data respectively. Communication layer 1632 may be programmed or configured to send the received data to model and field data repository 1660 to be stored as field data 1606.

Presentation layer 1634 may be programmed or configured to generate a graphical user interface (GUI) to be displayed on field manager computing device 1604, cab computer 1615 or other computers that are coupled to the system 1630 through the network 1609. The GUI may comprise controls for inputting data to be sent to agricultural intelligence computer system 1630, generating requests for models and/or recommendations, and/or displaying recommendations, notifications, models, and other field data.

Data management layer 1640 may be programmed or configured to manage read operations and write operations involving the repository 1660 and other functional elements of the system, including queries and result sets communicated between the functional elements of the system and the repository. Examples of data management layer 1640 include JDBC, SQL server interface code, and/or HADOOP interface code, among others. Repository 1660 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 1606 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 1602 may specify identification data by accessing a map on the user device (served by the agricultural intelligence computer system 1630) and drawing boundaries of the field over the map. Such CLU selection or map drawings represent geographic identifiers. In alternative embodiments, the user may specify identification data by accessing field identification data (provided as shape files or in a similar format) from the U.S. Department of Agriculture Farm Service Agency or other source via the user device and providing such field identification data to the agricultural intelligence computer system.

In an example embodiment, the agricultural intelligence computer system 1630 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 20:
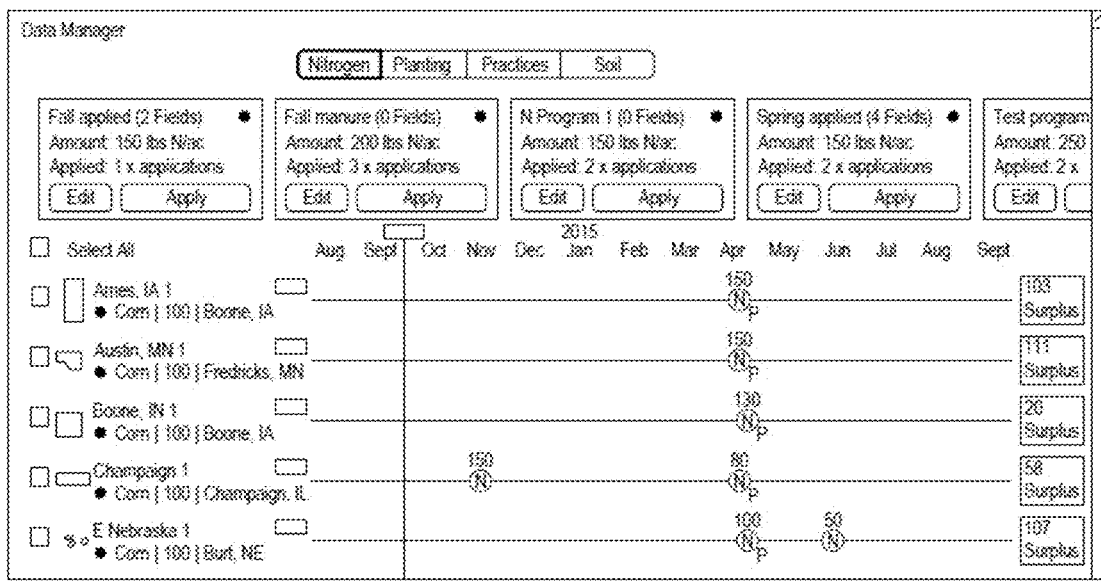
FIG. 20 depicts an example embodiment of a timeline view for data entry.

FIG. 20 depicts an example embodiment of a timeline view for data entry. Using the display depicted in FIG. 20, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 20, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 20, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 20, the interface may update to indicate that the "Spring applied" program is no longer being applied to the top field. While the nitrogen application in early April may remain, updates to the "Spring applied" program would not alter the April application of nitrogen.

Figure 21:
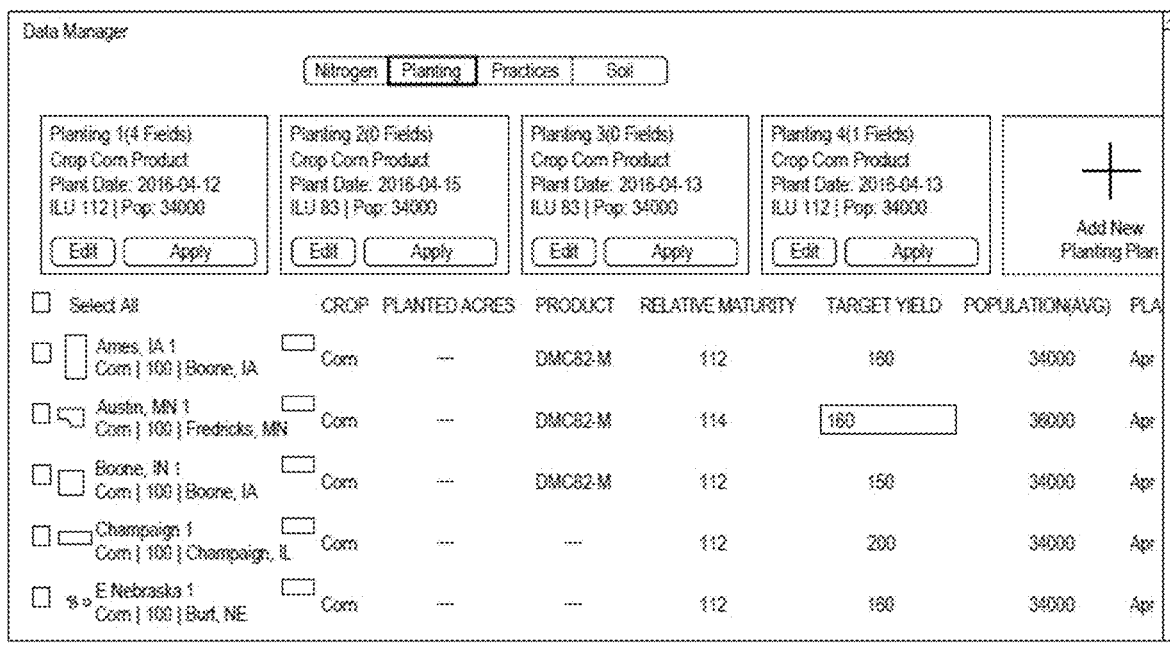
FIG. 21 depicts an example embodiment of a spreadsheet view for data entry.

FIG. 21 depicts an example embodiment of a spreadsheet view for data entry. Using the display depicted in FIG. 21, a user can create and edit information for one or more fields. The data manager may include spreadsheets for inputting information with respect to Nitrogen, Planting, Practices, and Soil as depicted in FIG. 21. To edit a particular entry, a user computer may select the particular entry in the spreadsheet and update the values. For example, FIG. 21 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 1660. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, imaging support instructions 1636 comprises a set of one or more pages of main memory, such as RAM, in the agricultural intelligence computer system 1630 into which executable instructions have been loaded and which when executed cause the agricultural intelligence computing system to perform the functions or operations that are described herein with reference to those modules. For example, the imaging support instructions 1636 may comprise a set of pages in RAM that contain instructions which when executed cause performing imaging support functions to assist the execution or outcome of steps 516, 518, 520 of FIG. 9. For example, the monitor 300 may be programmed to upload, via cab computer 1615, work layer images to computer system 1630 for cloud-based image analysis, and to receive, in response messages from the computer system, characterizations of the work layer images for use in the other processes that have been described in connection with FIG. 1 to FIG. 15. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of imaging support instructions 1636 also may represent one or more files or projects of source code that are digitally stored in a mass storage device such as non-volatile RAM or disk storage, in the agricultural intelligence computer system 1630 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 1630.

Figure 19:
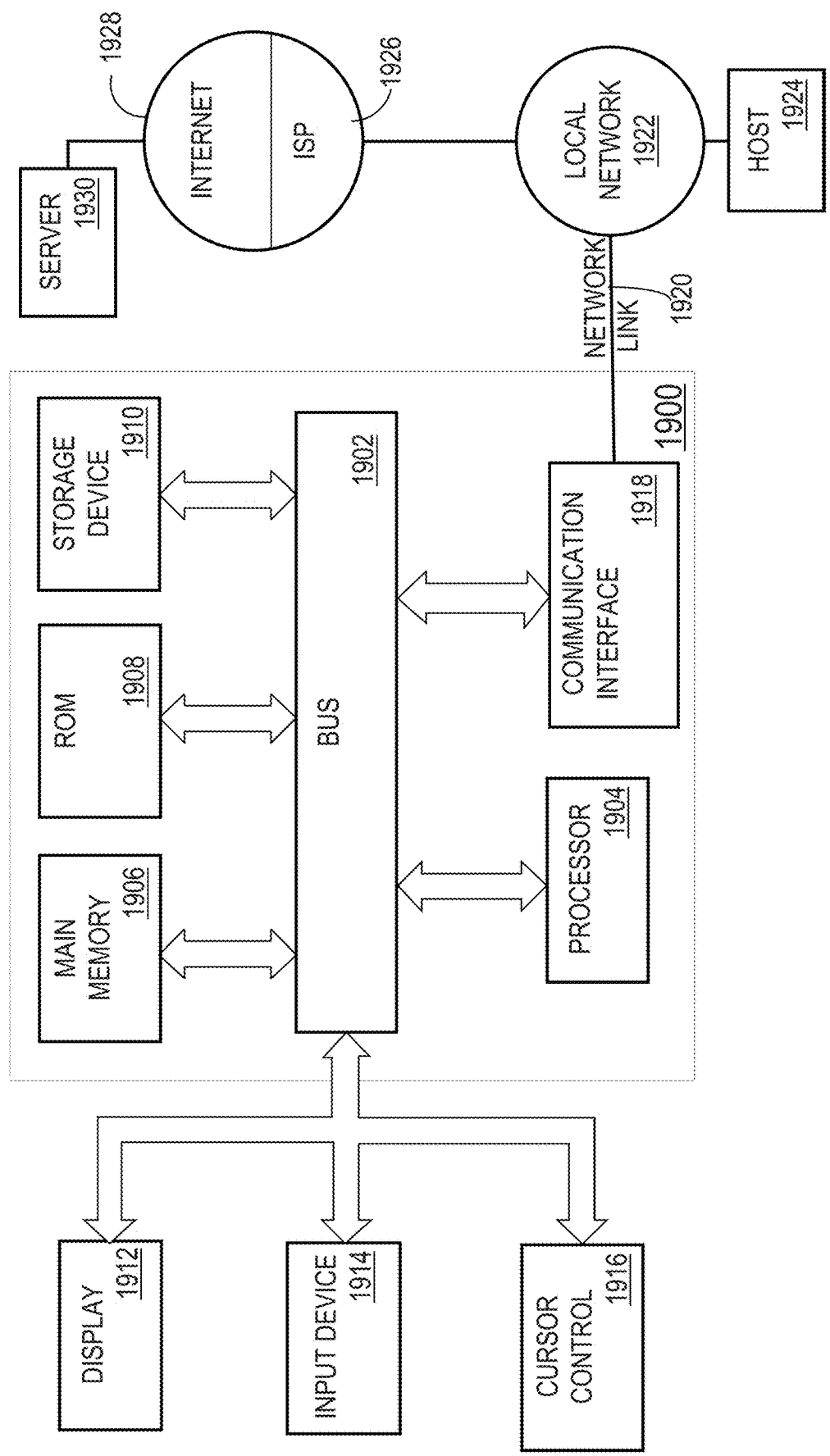
FIG. 19 is a block diagram that illustrates a computer system upon which an embodiment of the invention may be implemented.

Hardware/virtualization layer 1650 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 19. The layer 1650 also may comprise programmed instructions that are configured to support virtualization, containerization, or other technologies.

For purposes of illustrating a clear example, FIG. 16 shows a limited number of instances of certain functional elements. However, in other embodiments, there may be any number of such elements. For example, embodiments may use thousands or millions of different mobile computing devices 1604 associated with different users. Further, the system 1630 and/or external data server computer 1608 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 1602 interacts with agricultural intelligence computer system 1630 using field manager computing device 1604 configured with an operating system and one or more application programs or apps; the field manager computing device 1604 also may interoperate with the agricultural intelligence computer system independently and automatically under program control or logical control and direct user interaction is not always required. Field manager computing device 1604 broadly represents one or more of a smart phone, PDA, tablet computing device, laptop computer, desktop computer, workstation, or any other computing device capable of transmitting and receiving information and performing the functions described herein. Field manager computing device 1604 may communicate via a network using a mobile application stored on field manager computing device 1604, and in some embodiments, the device may be coupled using a cable 1613 or connector to the sensor 1612 and/or controller 1614. A particular user 1602 may own, operate or possess and use, in connection with system 1630, more than one field manager computing device 1604 at a time.

The mobile application may provide client-side functionality, via the network to one or more mobile computing devices. In an example embodiment, field manager computing device 1604 may access the mobile application via a web browser or a local client application or app. Field manager computing device 1604 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 1604 which determines the location of field manager computing device 1604 using standard tracking techniques such as multilateration of radio signals, the global positioning system (GPS), WiFi positioning systems, or other methods of mobile positioning. In some cases, location data or other data associated with the device 1604, user 1602, and/or user account(s) may be obtained by queries to an operating system of the device or by requesting an app on the device to obtain data from the operating system.

In an embodiment, field manager computing device 1604 sends field data 1606 to agricultural intelligence computer system 1630 comprising or including, but not limited to, data values representing one or more of: a geographical location of the one or more fields, tillage information for the one or more fields, crops planted in the one or more fields, and soil data extracted from the one or more fields. Field manager computing device 1604 may send field data 1606 in response to user input from user 1602 specifying the data values for the one or more fields. Additionally, field manager computing device 1604 may automatically send field data 1606 when one or more of the data values becomes available to field manager computing device 1604. For example, field manager computing device 1604 may be communicatively coupled to remote sensor 1612 and/or application controller 1614 which include an irrigation sensor and/or irrigation controller. In response to receiving data indicating that application controller 1614 released water onto the one or more fields, field manager computing device 1604 may send field data 1606 to agricultural intelligence computer system 1630 indicating that water was released on the one or more fields. Field data 1606 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 17:
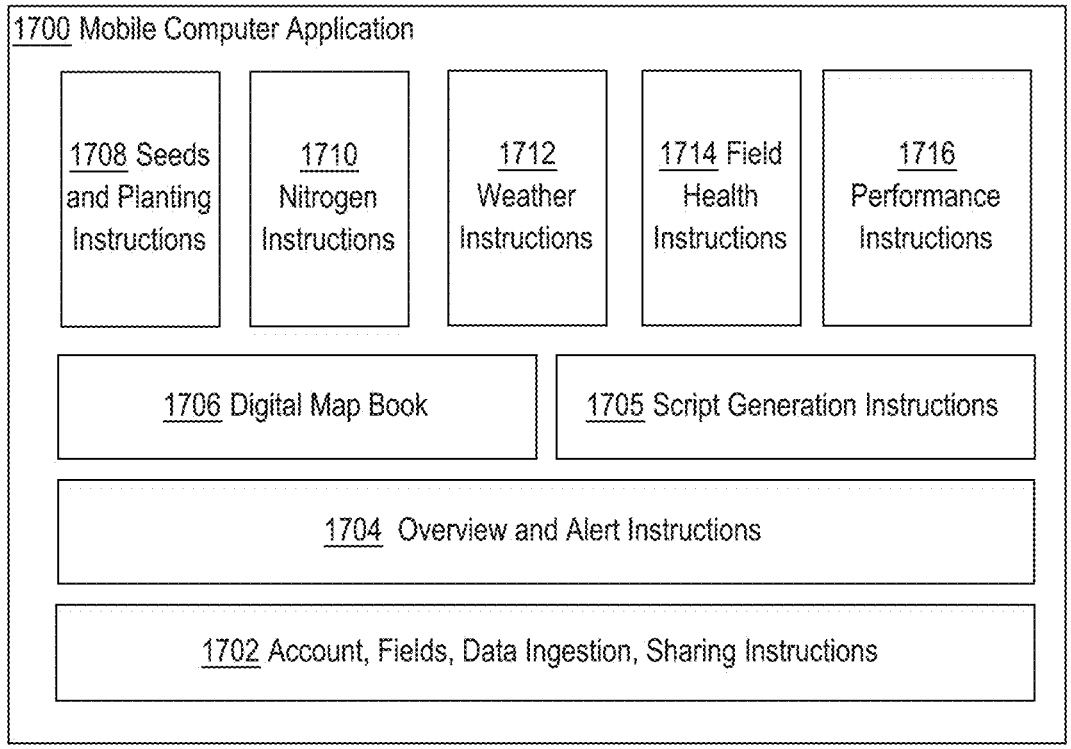
FIG. 17 illustrates two views of an example logical organization of sets of instructions in main memory when an example mobile application is loaded for execution.
Figure 17:
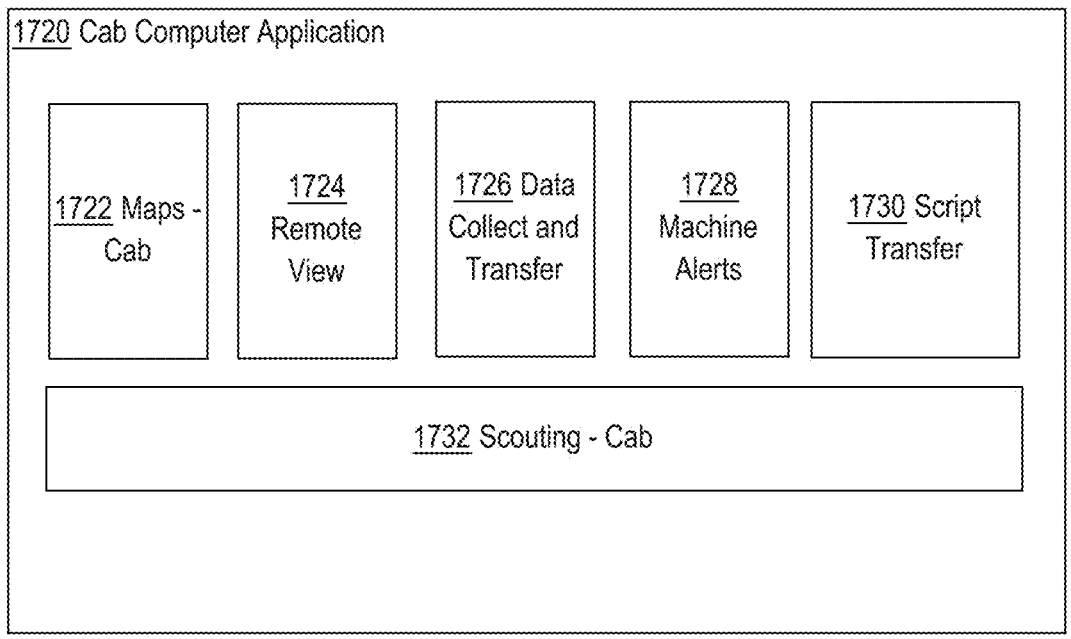

FIG. 17 illustrates two views of an example logical organization of sets of instructions in main memory when an example mobile application is loaded for execution. In FIG. 17, each named element represents a region of one or more pages of RAM or other main memory, or one or more blocks of disk storage or other non-volatile storage, and the programmed instructions within those regions. In one embodiment, in view (a), a mobile computer application 1700 comprises account-fields-data ingestion-sharing instructions 1702, overview and alert instructions 1704, digital map book instructions 1706, seeds and planting instructions 1708, nitrogen instructions 1710, weather instructions 1712, field health instructions 1714, and performance instructions 1716.

In one embodiment, a mobile computer application 1700 comprises account, fields, data ingestion, sharing instructions 1702 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 1700 comprises a data inbox. In response to receiving a selection of the data inbox, the mobile computer application 1700 may display a graphical user interface for manually uploading data files and importing uploaded files to a data manager.

In one embodiment, digital map book instructions 1706 comprise field map data layers stored in device memory and are programmed with data visualization tools and geospatial field notes. This provides growers with convenient information close at hand for reference, logging and visual insights into field performance. In one embodiment, overview and alert instructions 1704 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 1708 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 1705 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 1700 may display one or more fields broken into management zones, such as the field map data layers created as part of digital map book instructions 1706. In one embodiment, the management zones comprise soil zones along with a panel identifying each soil zone and a soil name, texture, drainage for each zone, or other field data. Mobile computer application 1700 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 1700 may make the script available for download in a format readable by an application controller, such as an archived or compressed format. Additionally, and/or alternatively, a script may be sent directly to cab computer 1615 from mobile computer application 1700 and/or uploaded to one or more data servers and stored for further use.

In one embodiment, nitrogen instructions 1710 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 1700. For example, nitrogen instructions 1710 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 1710 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 1710 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 1710 could be used for application of other nutrients (such as phosphorus and potassium), application of pesticide, and irrigation programs.

In one embodiment, weather instructions 1712 are programmed to provide field-specific recent weather data and forecasted weather information. This enables growers to save time and have an efficient integrated display with respect to daily operational decisions.

In one embodiment, field health instructions 1714 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 1716 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 1716 may be programmed to communicate via the network(s) 1609 to back-end analytics programs executed at agricultural intelligence computer system 1630 and/or external data server computer 1608 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 1615. For example, referring now to view (b) of FIG. 17, in one embodiment a cab computer application 1720 may comprise maps-cab instructions 1722, remote view instructions 1724, data collect and transfer instructions 1726, machine alerts instructions 1728, script transfer instructions 1730, and scouting-cab instructions 1732. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 1722 may be programmed to provide map views of fields, farms or regions that are useful in directing machine operation. The remote view instructions 1724 may be programmed to turn on, manage, and provide views of machine activity in real-time or near real-time to other computing devices connected to the system 1630 via wireless networks, wired connectors or adapters, and the like. The data collect and transfer instructions 1726 may be programmed to turn on, manage, and provide transfer of data collected at sensors and controllers to the system 1630 via wireless networks, wired connectors or adapters, and the like. The machine alerts instructions 1728 may be programmed to detect issues with operations of the machine or tools that are associated with the cab and generate operator alerts. The script transfer instructions 1730 may be configured to transfer in scripts of instructions that are configured to direct machine operations or the collection of data. The scouting-cab instructions 1732 may be programmed to display location-based alerts and information received from the system 1630 based on the location of the field manager computing device 1604, agricultural apparatus 1611, or sensors 1612 in the field and ingest, manage, and provide transfer of location-based scouting observations to the system 1630 based on the location of the agricultural apparatus 1611 or sensors 1612 in the field.

2.3. Data Ingest to the Computer System

In an embodiment, external data server computer 1608 stores external data 1610, including soil data representing soil composition for the one or more fields and weather data representing temperature and precipitation on the one or more fields. The weather data may include past and present weather data as well as forecasts for future weather data. In an embodiment, external data server computer 1608 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 1612 comprises one or more sensors that are programmed or configured to produce one or more observations. Remote sensor 1612 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 1614 is programmed or configured to receive instructions from agricultural intelligence computer system 1630. Application controller 1614 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 1630 may obtain or ingest data under user 1602 control, on a mass basis from a large number of growers who have contributed data to a shared database system. This form of obtaining data may be termed "manual data ingest" as one or more user-controlled computer operations are requested or triggered to obtain data for use by the system 1630. As an example, the CLIMATE FIELDVIEW application, commercially available from The Climate Corporation, San Francisco, Calif., may be operated to export data to system 1630 for storing in the repository 1660.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 1615 or other devices within the system 1630. Examples are disclosed in U.S. Pat. No. 8,738,243 and US Pat. Pub. 170150094916, and the present disclosure assumes knowledge of those other patent disclosures.

Likewise, yield monitor systems may contain yield sensors for harvester apparatus that send yield measurement data to the cab computer 1615 or other devices within the system 1630. Yield monitor systems may utilize one or more remote sensors 1612 to obtain grain moisture measurements in a combine or other harvester and transmit these measurements to the user via the cab computer 1615 or other devices within the system 1630.

In an embodiment, examples of sensors 1612 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 1612 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 1614 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 1612 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 1614 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches;

hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 1612 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 1614 that may be used with tillage equipment include downforce controllers or tool position controllers, such as controllers configured to control tool depth, gang angle, or lateral spacing.

In an embodiment, examples of sensors 1612 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 1614 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 1612 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 1614 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 1612 that may be used with grain carts include weight sensors, or sensors for auger position, operation, or speed. In an embodiment, examples of controllers 1614 that may be used with grain carts include controllers for auger position, operation, or speed.

In an embodiment, examples of sensors 1612 and controllers 1614 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. Pat. App. No. 164/831,165 and the present disclosure assumes knowledge of that other patent disclosure.

In an embodiment, sensors 1612 and controllers 1614 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 1612 and controllers 1614 may comprise weather devices for monitoring weather conditions of fields. For example, the apparatus disclosed in U.S. Provisional Application No. 212/154,207, filed on April 179, 17015, U.S. Provisional Application No. 212/175,160, filed on June 162, 17015, U.S. Provisional Application No. 212/198,060, filed on July 178, 17015, and U.S. Provisional Application No. 212/220,852, filed on September 168, 17015, may be used, and the present disclosure assumes knowledge of those patent disclosures.

2.4. Process Overview-Agronomic Model Training

In an embodiment, the agricultural intelligence computer system 1630 is programmed or configured to create an agronomic model. In this context, an agronomic model is a data structure in memory of the agricultural intelligence computer system 1630 that comprises field data 1606, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 1630 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 18:
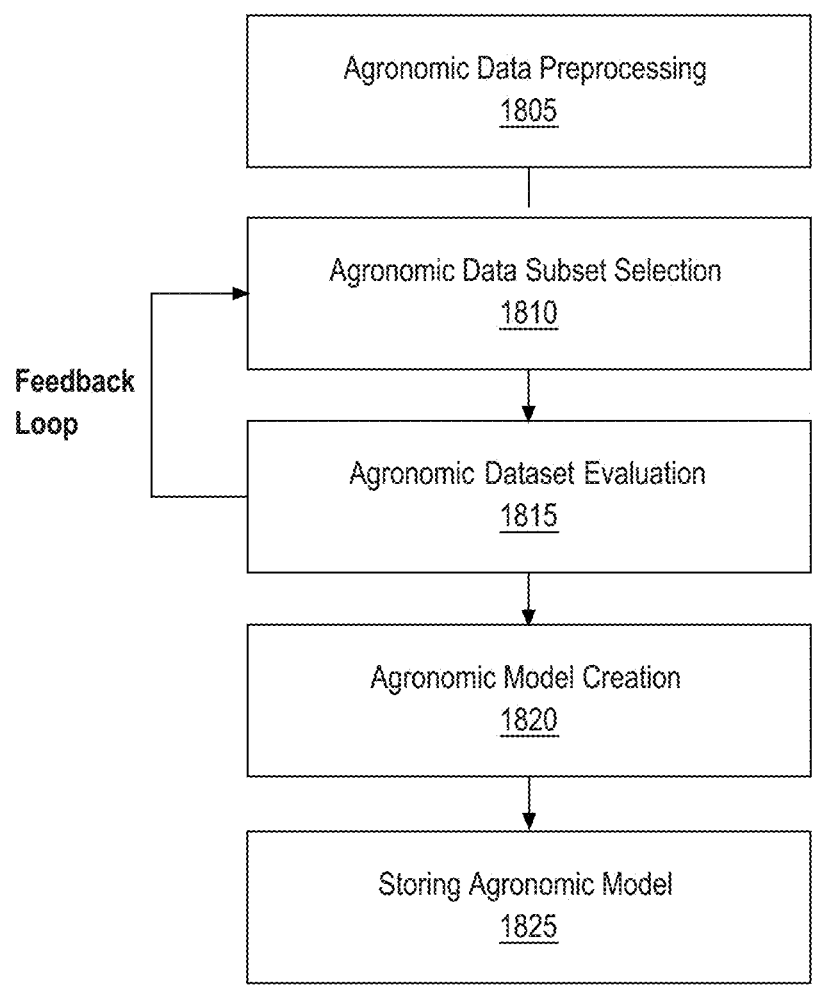
FIG. 18 illustrates a programmed process by which the agricultural intelligence computer system generates one or more preconfigured agronomic models using agronomic data provided by one or more data sources.

FIG. 18 illustrates a programmed process by which the agricultural intelligence computer system generates one or more preconfigured agronomic models using field data provided by one or more data sources. FIG. 18 may serve as an algorithm or instructions for programming the functional elements of the agricultural intelligence computer system 1630 to perform the operations that are now described.

At block 1805, the agricultural intelligence computer system 1630 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 1810, the agricultural intelligence computer system 1630 is configured or programmed to perform data subset selection using the preprocessed field data in order to identify datasets useful for initial agronomic model generation. The agricultural intelligence computer system 1630 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 1815, the agricultural intelligence computer system 1630 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 1810).

At block 1820, the agricultural intelligence computer system 1630 is configured or programmed to implement agronomic model creation based upon the cross validated agronomic datasets. In an embodiment, agronomic model creation may implement multivariate regression techniques to create preconfigured agronomic data models.

At block 1825, the agricultural intelligence computer system 1630 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 19 is a block diagram that illustrates a computer system 1900 upon which an embodiment of the invention may be implemented. Computer system 1900 includes a bus 1902 or other communication mechanism for communicating information, and a hardware processor 1904 coupled with bus 1902 for processing information. Hardware processor 1904 may be, for example, a general purpose microprocessor.

Computer system 1900 also includes a main memory 1906, such as a random access memory (RAM) or other dynamic storage device, coupled to bus 1902 for storing information and instructions to be executed by processor 1904. Main memory 1906 also may be used for storing temporary variables or other intermediate information during execution of instructions to be executed by processor 1904. Such instructions, when stored in non-transitory storage media accessible to processor 1904, render computer system 1900 into a special-purpose machine that is customized to perform the operations specified in the instructions.

Computer system 1900 further includes a read only memory (ROM) 1908 or other static storage device coupled to bus 1902 for storing static information and instructions for processor 1904. A storage device 1910, such as a magnetic disk, optical disk, or solid-state drive is provided and coupled to bus 1902 for storing information and instructions.

Computer system 1900 may be coupled via bus 1902 to a display 1912, such as a cathode ray tube (CRT), for displaying information to a computer user. An input device 1914, including alphanumeric and other keys, is coupled to bus 1902 for communicating information and command selections to processor 1904. Another type of user input device is cursor control 1916, such as a mouse, a trackball, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

Computer system 1900 may implement the techniques described herein using customized hard-wired logic, one or more ASICs or FPGAs, firmware and/or program logic which in combination with the computer system causes or programs computer system 1900 to be a special-purpose machine. According to one embodiment, the techniques herein are performed by computer system 1900 in response to processor 1904 executing one or more sequences of one or more instructions contained in main memory 1906. Such instructions may be read into main memory 1906 from another storage medium, such as storage device 1910. Execution of the sequences of instructions contained in main memory 1906 causes processor 1904 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1910. Volatile media includes dynamic memory, such as main memory 1906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1902. Transmission media can also take the form of acoustic or light waves, such as those generated during radio-wave and infrared data communications.

Various forms of media may be involved in carrying one or more sequences of one or more instructions to processor 1904 for execution. For example, the instructions may initially be carried on a magnetic disk or solid-state drive of a remote computer. The remote computer can load the instructions into its dynamic memory and send the instructions over a telephone line using a modem. A modem local to computer system 1900 can receive the data on the telephone line and use an infra-red transmitter to convert the data to an infra-red signal. An infra-red detector can receive the data carried in the infrared signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network (ISDN) card, cable modem, satellite modem, or a modem to provide a data communication connection to a corresponding type of telephone line. As another example, communication interface 1918 may be a local area network (LAN) card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider (ISP) 1926. ISP 1926 in turn provides data communication services through the world wide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are example forms of transmission media.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918.

The received code may be executed by processor 1904 as it is received, and/or stored in storage device 1910, or other non-volatile storage for later execution.

What is claimed is:

1. A soil imaging system comprising:
at least one work layer sensor on an agricultural implement, the work layer sensor generating an electromagnetic field through a seed trench as the agricultural implement traverses a field;
wherein the work layer sensor comprises a first transmitter, a second transmitter, a third transmitter, a first receiver, a second receiver, and a third receiver;
the second receiver rearward of the second transmitter over the seed trench in a first linear direction which is a direction of travel of the agricultural implement, the first transmitter and the third transmitter over opposite sides of the seed trench in a second linear direction with the second transmitter which is different than the first linear direction, the first receiver and the third receiver over opposite sides of the seed trench in a third linear direction with the second receiver which is different than the first linear direction, and the first receiver and the third receiver rearward of the first transmitter and the third transmitter, respectively, in the first linear direction;
a monitor in communication with the work layer sensor and adapted to generate a work layer image of a soil layer based on the generated electromagnetic field through the soil layer.

2. The soil imaging system of claim 1 wherein the work layer sensor is mounted to a planter row unit or a planter and the monitor is within a cab of a tractor attached to the planter.

3. The soil imaging system of claim 1, wherein the work layer sensor is configured to generate a reference image by generating an electromagnetic field through undisturbed soil; wherein the monitor is configured to compare at least one characteristic of the reference image with at least one characteristic of the work layer image to generate a characterized image of the work layer of interest.

4. The soil imaging system of claim 3, wherein the monitor is configured to affect operational control of the agricultural implement based on the characterized image using one or more actuators on the agricultural implement.

5. The soil imaging system of claim 4, wherein the monitor is configured to affect operational control of the agricultural implement based on the characterized image by performing one or more of: actuating a row cleaner actuator to increase row cleaner downforce; actuating a downforce control system to increase downforce; actuating a depth adjustment actuator to increase or decrease trench depth; actuating a trench closing wheel assembly actuator to increase downforce on closing wheels; or actuating a packer wheel assembly actuator to increase downforce on a packer wheel.

6. The soil imaging system of claim 1, wherein:
the monitor is configured to perform one or more operations of: identifying that a seed is irregularly spaced in the trench; identifying that a seed is not uniformly deposited in a base of the trench; identifying that spacing of a seed in the trench does not match an anticipated spacing of the seed;
the monitor is configured to perform, in response to any of the identification operations, displaying a recommendation to decrease planting speed or increase downforce.

7. The soil imaging system of claim 1, wherein the work layer sensor comprises any of: a ground penetrating radar system, an ultrasound system, an audible range sound system, or an electrical current system.

8. The soil imaging system of claim 1, wherein the monitor is adapted to generate the work layer image comprising one or more of: trench depth, trench shape, depth of seed, seed depth relative to trench depth, crop residue in the trench, or void spaces in the trench.

9. The soil imaging system of claim 1, wherein at least the first transmitter has an operating frequency of 1 GHz to 100 GHz.

10. The soil imaging system of claim 1, wherein at least one transmitter is over the seed trench and has a transmitting angle such that a signal from the at least one transmitter reaches each side of the seed trench.

11. The soil imaging system of claim 1, wherein the work layer sensor is one of: a phased array radar and a Doppler radar.

12. A soil imaging system comprising:
at least one work layer sensor on an agricultural implement, the work layer sensor generating an electromagnetic field through a seed trench as the agricultural implement traverses a field;
wherein the work layer sensor comprises a transmitter, a first receiver, a second receiver, and a third receiver;
the second receiver rearward of and the transmitter over the seed trench in a first linear direction which is a direction of travel of the agricultural implement, the first receiver and the third receiver over opposite sides of the seed trench in a second linear direction with the second receiver that is different than the first linear direction, the first receiver rearward of the transmitter in a third linear direction that is different than the first linear direction and the third receiver rearward of the transmitter in a fourth linear direction that is different than the first linear direction;
a monitor in communication with the work layer sensor and adapted to generate a work layer image of the soil layer based on the generated electromagnetic field through the soil layer.

13. The soil imaging system of claim 12, wherein at least one transmitter is over the seed trench and has a transmitting angle such that a signal from the at least one transmitter reaches each side of the seed trench.

14. The soil imaging system of claim 12, wherein the work layer sensor is one of: a phased array radar and a Doppler radar.

15. A soil imaging system comprising:
a mobile agricultural implement;
a plurality of transmitters;
a plurality of receivers;
a digital monitor coupled to the mobile agricultural implement; and
a processor and main memory comprising instructions which, when executed, cause:
generating, by the plurality of transmitters, an electromagnetic field through a seed trench as the mobile agricultural implement traverses a field;
wherein the plurality of transmitters comprises a first transmitter, a second transmitter, and a third transmitter;
receiving, by the plurality of receivers, electromagnetic signals;
wherein the plurality of receivers comprises a first receiver, a second receiver, and a third receiver;
wherein the second receiver is rearward of the second transmitter over the seed trench in a first linear direction which is a direction of travel of the mobile agricultural implement, the first transmitter and the third transmitter are over opposite sides of the seed trench in a second linear direction with the second transmitter which is different than the first linear direction, the first receiver and the third receiver are over opposite sides of the seed trench in a third linear direction with the second receiver which is different than the first linear direction, and the first receiver and the third receiver are rearward of the first transmitter and the third transmitter, respectively, in the first linear direction;
generating a work layer image of a soil layer based on the generated electromagnetic field and the received electromagnetic signals.

16. The soil imaging system of claim 15, the processor and main memory further comprising instructions which, when executed, cause generating an electromagnetic field through undisturbed soil; wherein the digital monitor is configured to compare at least one characteristic of the reference image with at least one characteristic of the work layer image to generate a characterized image of the work layer of interest.

17. The soil imaging system of claim 16, wherein the digital monitor is configured to affect operational control of the mobile agricultural implement based on the characterized image using one or more actuators coupled to the mobile agricultural implement.

18. The soil imaging system of claim 17, wherein the digital monitor is configured to affect operational control of the agricultural implement based on the characterized image by performing one or more of: actuating a row cleaner actuator to increase row cleaner downforce; actuating a downforce control system to increase downforce; actuating a depth adjustment actuator to increase or decrease trench depth; actuating a trench closing wheel assembly actuator to increase downforce on closing wheels; or actuating a packer wheel assembly actuator to increase downforce on a packer wheel.

19. The soil imaging system of claim 15, wherein:
the digital monitor is configured to perform one or more operations of: identifying that a seed is irregularly spaced in the trench; identifying that a seed is not uniformly deposited in a base of the trench; identifying that spacing of a seed in the trench does not match an anticipated spacing of the seed;

the digital monitor is configured to perform, in response to any of the identification operations, displaying a recommendation to decrease planting speed or increase downforce.

20. The soil imaging system of claim 15, wherein the plurality of transmitters and the plurality of receivers further comprise any of: a ground penetrating radar system, an ultrasound system, an audible range sound system, or an electrical current system.

* * * * *

UNITED STATES PATENT AND TRADEMARK OFFICE
CERTIFICATE OF CORRECTION

PATENT NO. : 10,768,331 B2
APPLICATION NO. : 15/793840
DATED : September 8, 2020
INVENTOR(S) : Dale Koch et al.

It is certified that error appears in the above-identified patent and that said Letters Patent is hereby corrected as shown below:

In the Claims

Column 29
Claim 12: Line 46: Delete "rearward of and the" and insert --rearward of the--.

Signed and Sealed this
Sixth Day of October, 2020

Andrei Iancu
*Director of the United States Patent and Trademark Office*